United States Patent
Porter

(10) Patent No.: US 7,529,274 B2
(45) Date of Patent: May 5, 2009

(54) COMMUNICATION SYSTEM WITH VARIABLE LENGTH DATA FRAMES

(75) Inventor: John David Porter, Gt. Shelford (GB)

(73) Assignee: Cambridge Broadband Networks Limited, Cambridge (GB)

(*) Notice: Subject to any disclaimer, the term of this patent is extended or adjusted under 35 U.S.C. 154(b) by 673 days.

(21) Appl. No.: 10/483,515

(22) PCT Filed: Jul. 10, 2002

(86) PCT No.: PCT/GB02/03172

§ 371 (c)(1), (2), (4) Date: May 6, 2004

(87) PCT Pub. No.: WO03/007501

PCT Pub. Date: Jan. 23, 2003

(65) Prior Publication Data
US 2004/0180679 A1 Sep. 16, 2004

(30) Foreign Application Priority Data
Jul. 11, 2001 (GB) ................. 0116883.0

(51) Int. Cl.
*H04J 3/06* (2006.01)
(52) U.S. Cl. .......... 370/512; 370/503; 370/350; 370/395.64; 370/905; 455/502
(58) Field of Classification Search .......... 370/512, 370/503, 509, 510, 458, 468, 474, 320, 321, 370/324, 330, 342, 348, 350, 376, 395.64, 370/139, 329, 905, 310.1, 455, 502, 522, 370/63.1, 67.11, 69, 450; 455/502, 522, 455/63.1, 67.11, 450, 69
See application file for complete search history.

(56) References Cited

U.S. PATENT DOCUMENTS

| | | | |
|---|---|---|---|
| 5,222,102 A | | 6/1993 | Remson |
| 5,541,924 A | * | 7/1996 | Tran et al. ................. 370/347 |
| 5,809,093 A | | 9/1998 | Cooper |
| 5,898,684 A | | 4/1999 | Currivan et al. |
| 6,047,189 A | * | 4/2000 | Yun et al. ................. 455/452.2 |
| 6,055,242 A | * | 4/2000 | Doshi et al. ................. 370/458 |
| 6,075,787 A | * | 6/2000 | Bobeck et al. ............. 370/395.2 |
| 6,175,560 B1 | * | 1/2001 | Bhagalia et al. ............. 370/342 |
| 6,285,886 B1 | * | 9/2001 | Kamel et al. ................. 455/522 |
| 6,466,569 B1 | * | 10/2002 | Wright et al. ................. 370/347 |

(Continued)

FOREIGN PATENT DOCUMENTS

EP  0 713 347  5/1996

(Continued)

*Primary Examiner*—Matthew D Anderson
*Assistant Examiner*—Shaima Q Aminzay
(74) *Attorney, Agent, or Firm*—Fish & Richardson P.C.

(57) ABSTRACT

A wireless communications system in which an access point (AP) transmits a downlink signal for reception by one or more subscriber unit(s) (SU) and the subscriber unit (SU) transmits an uplink signal for reception by the access point (AP). The downlink signal from the access point (AP) carries syncronisation bursts (2) at predetermined times and data contained in frames interleaved between the synchronisation bursts. Each synchronisation burst comprises an offset pointer (4) to the start of the subsequent downlink frame.

27 Claims, 20 Drawing Sheets

U.S. PATENT DOCUMENTS

| | | | |
|---|---|---|---|
| 6,594,252 B1 * | 7/2003 | Barany et al. | 370/347 |
| 6,628,697 B1 * | 9/2003 | Douglas et al. | 375/139 |
| 6,684,061 B1 * | 1/2004 | Yost | 455/67.11 |
| 6,879,823 B1 * | 4/2005 | Raaf | 455/414.1 |
| 7,050,419 B2 * | 5/2006 | Azenkot et al. | 370/347 |
| 7,068,631 B2 * | 6/2006 | Eriksson et al. | 370/337 |
| 7,209,455 B2 * | 4/2007 | Yee et al. | 370/310.1 |
| 2001/0001616 A1 | 5/2001 | Rakib et al. | |
| 2003/0219030 A1 * | 11/2003 | Gubbi | 370/442 |

FOREIGN PATENT DOCUMENTS

| | | |
|---|---|---|
| EP | 0 975 190 | 1/2000 |
| EP | 1 067 704 | 1/2001 |
| JP | 03-080728 | 4/1991 |
| WO | WO96/38930 | 12/1996 |
| WO | WO00/52943 | 9/2000 |
| WO | WO00/62457 | 10/2000 |

* cited by examiner

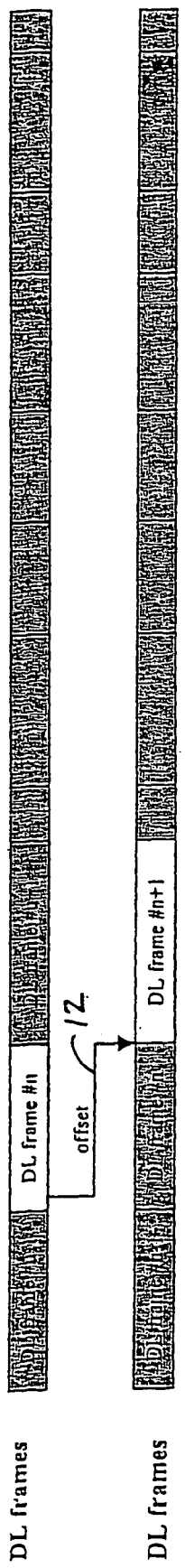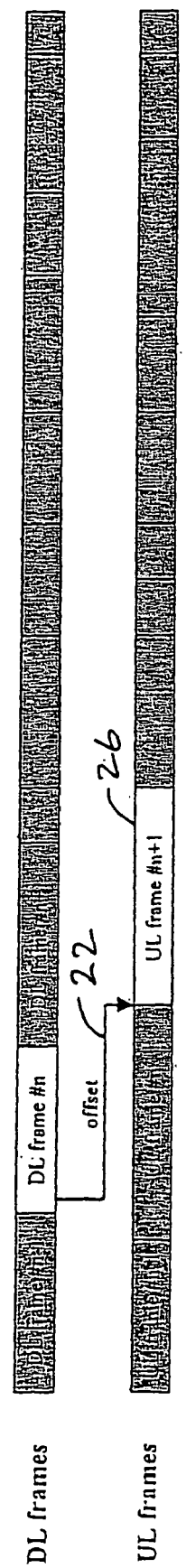
FIGURE 4
FIGURE 5

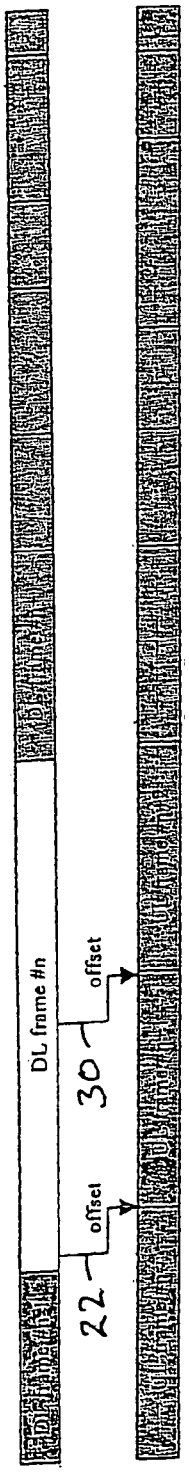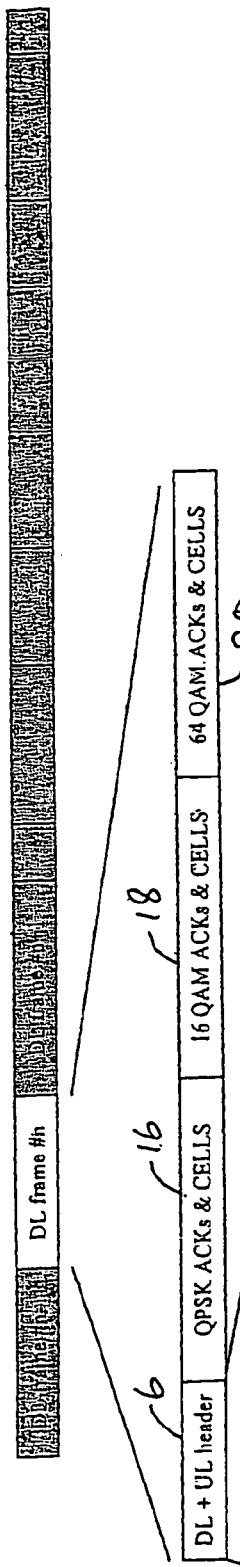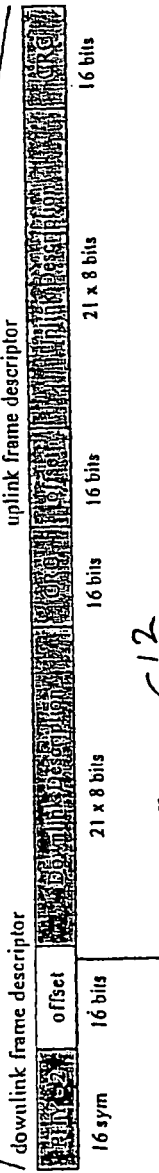
FIGURE 7
FIGURE 8
Downlink Frame Synchronisation

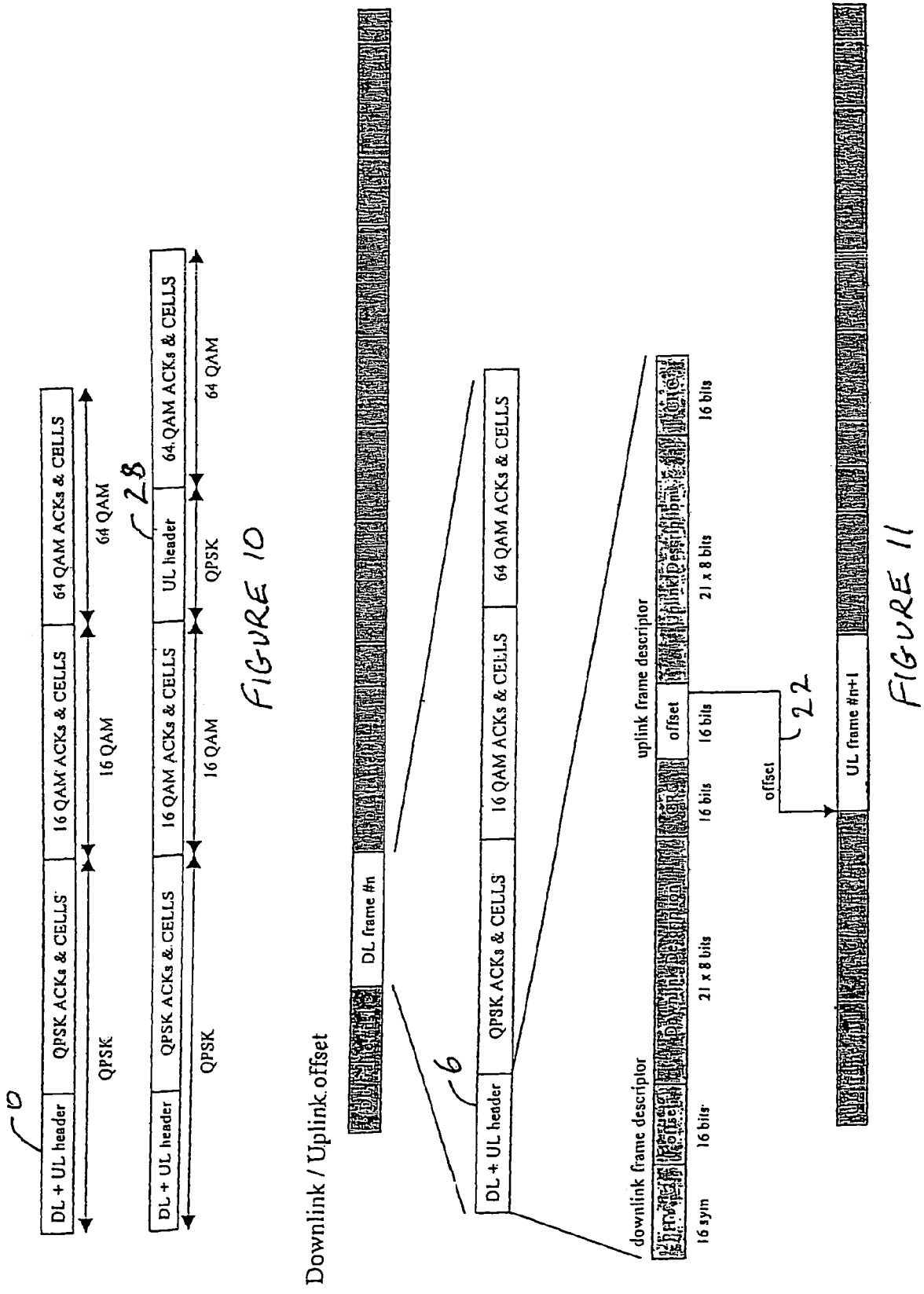

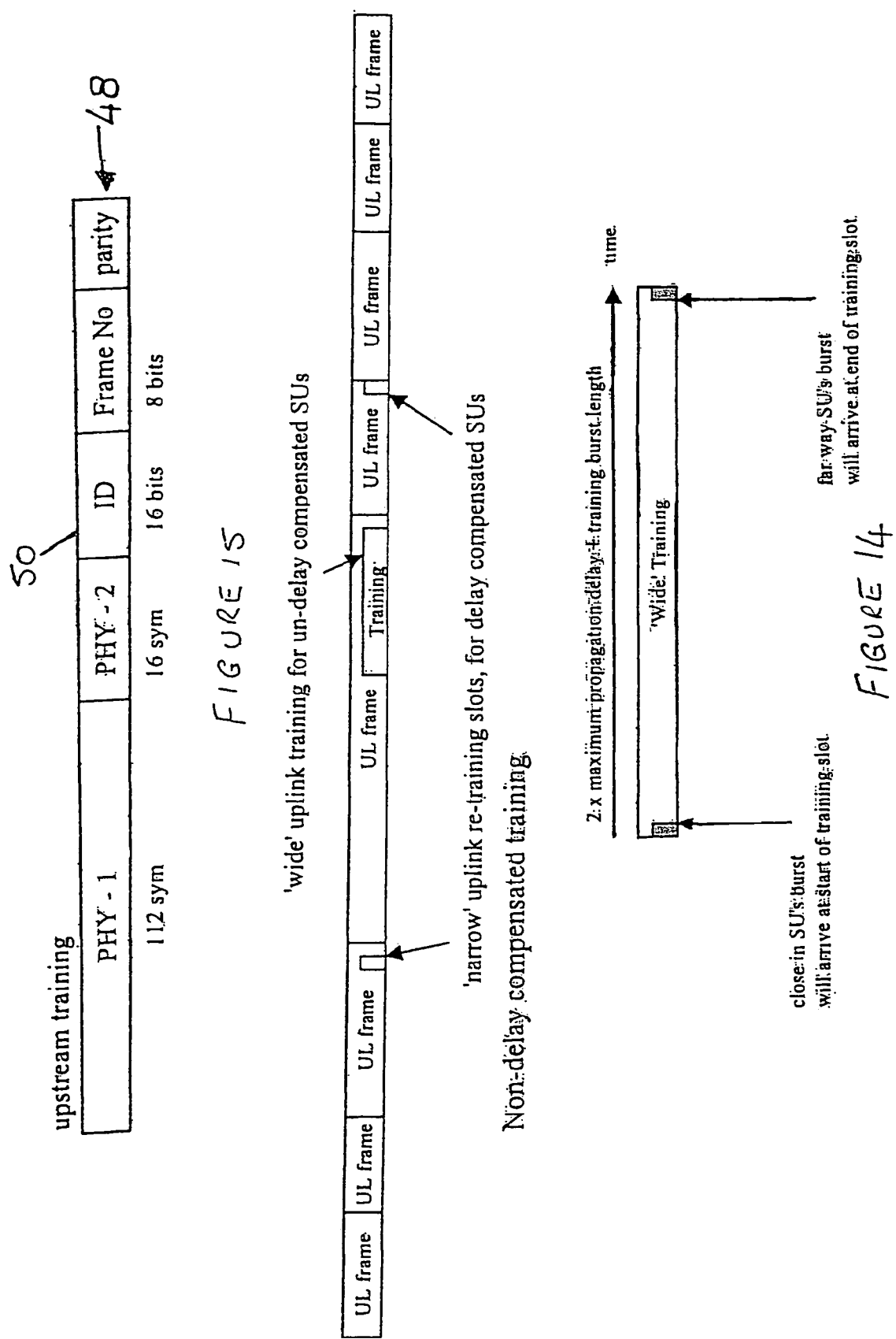

COMMUNICATION SYSTEM WITH VARIABLE LENGTH DATA FRAMES

The invention relates to aspects of a communications protocol and in particular to aspects of a communications protocol for a multi-user wireless communications system.

The invention further relates to a communications system using such protocols, a method for wireless communication between an access point and a plurality of subscriber units, and to a radio signal for transmission between an access point and a subscriber unit.

DESCRIPTION OF THE PRIOR ART

In a multi-user wireless communications system, and in particular in a fixed wireless access (FWA) system, a single access point (AP) communicates with a number of subscriber units (SUs). Since APs are typically more expensive than SUs and more expensive to site, an AP should preferably be able to communicate with as many SUs as possible. In a wireless system, however, bandwidth is usually limited and so it is very important to use bandwidth as efficiently as possible.

Subscriber traffic usually includes data and voice traffic. Voice traffic is relatively easy for a system operator to handle, because a voice channel can be fragmented almost arbitrarily in the radio link in order to suit the communications protocol used by the system operator. Data traffic is more difficult to handle because it involves the provision of widely varying amounts of bandwidth to different subscribers at different times according to their individual requirements.

In conventional systems, problems arise in efficiently packaging data traffic into the system operator's communications protocol. For example, in a radio network it is advantageous to use a communications protocol having fixed-length frames because it is easy for radio receivers to synchronise to such a structure.

An example is International Patent Application No. WO96/38930 which discloses an apparatus and method for establishing and maintaining communication paths in a wireless telecommunication system. The receiver of a subscriber terminal compares a code and phase of a master code sequence in the downlink signal to a code and phase of a slave code sequence of the receiver. The receiver adjusts the phase of the slave code sequence until a match is obtained with the master code sequence. The downlink signal includes an overhead channel having a power control signal, a code synchronization signal, and a frame alignment signal. A receiver in the central terminal monitors an uplink signal transmitted by the transmitter in the subscriber terminal and provides changes to the code synchronisation signal such that the transmitter is synchronised to the receiver. The receiver monitors the downlink signal to identify the frame alignment signal and establishes the downlink communication path when two successive frame alignment signals are identified. In an acquisition mode during establishment of the downlink communication path, the downlink signal is transmitted at a high power level and a low transmit rate. In a standby mode after establishment of the downlink communication path, the downlink signal is transmitted at a low power level and a low transmit rate. In a traffic mode upon a request for wireless communication transmission, the downlink signal is transmitted at a high power level and a high transmit rate.

Problems arise, however, in using bandwidth efficiently within fixed-length frames when users are sending different types of traffic.

The present invention aims to overcome these and other limitations of conventional systems.

SUMMARY OF THE INVENTION

The invention provides various aspects of a communications protocol as defined in the appended independent claims, to which reference should now be made. Preferred or advantageous features of the invention are defined in dependent sub-claims.

In a first aspect, the invention therefore provides a communications protocol for a radio system in which, on the downlink, variable-length frames are dispersed around is a regular, periodic, structure of synchronisation bursts. Each synchronisation burst contains a pointer to the start of the next frame. SUs can therefore synchronise to the regular synchronisation bursts and use them to find the frame structure, while the system can efficiently package data within the variable-length frames, according to user demand.

Each frame advantageously starts with a header. This not only describes the contents of the frame, which have been scheduled by the AP, but also a pointer to the start of the next downlink frame. SUs which continuously decode the downlink frames can therefore retain synchronisation without needing to refer to every synchronisation burst.

In a further aspect of the invention, an uplink carries variable-length frames, in which the AP can efficiently schedule data transmissions from the SUs. The contents of the uplink frames are advantageously described in an uplink description within: each downlink header. If required, for example if a downlink frame is much longer than the following uplink frames, then one or more extra uplink descriptions may be scheduled within a downlink frame. This advantageously ensures efficient use of the uplink.

When a SU is initialised, or switched on, it can receive the downlink but needs to train to acquire details of the uplink channel before it can transmit effectively on the uplink. In a further aspect of the invention, the AP regularly broadcasts basic information which, in combination with a SU's observations of the downlink, advantageously allow the SU to transmit an initial training burst. The AP gives the SU an opportunity to transmit this burst within a wide training slot, which is sufficiently wide to allow for propagation delays between the AP and the SU. Each training burst contains an address of the SU which sent it, and so following successful receipt of a training burst within a wide training slot, the AP can send information to the SU to improve its subsequent transmissions. The AP can preferably schedule additional narrow training slots (which consume less uplink bandwidth than wide training slots) to allow the transmission of training bursts by SUs which already have timing information to compensate for propagation delays. These training opportunities may allow SUs to follow changes in the uplink transmission channel over time.

In a further aspect of the invention, the AP can schedule contention slots, in which a SU wishing to transmit data can transmit a contention burst. The AP may not know in advance which SU is transmitting a particular contention burst, and so SUs pre-distort their contention bursts (preferably using information gained during the training procedure) for reception by the AP. Advantageously, the AP may be able to receive contention bursts without using an equaliser. A contention burst identifies the SU which sent it, and so when a contention burst is successfully received, the AP can enter into a dialogue with the SU regarding the SU's bandwidth requirements, and can ultimately schedule uplink bandwidth for the SU as required.

Advantageously, the communications system of the invention uses asynchronous transfer mode (ATM) cells for carrying both control and data information on the uplink and the downlink. This allows very efficient packaging within the variable-length frames.

In a radio communications system, channel conditions may lead to failure to receive transmitted information. Under these circumstances, an efficient acknowledgment procedure is desirable, to ensure that any lost data is re-transmitted. A further aspect of the invention addresses this problem. When a SU receives scheduled ATM cells from the AP, these cells are sequentially numbered as in a conventional ATM transmission. If all the cells are successfully received, the SU acknowledges their receipt, but if reception of any of the cells fails, the SU sends an acknowledgment message containing a sequence number to identify the first failed cell. The AP then only needs to re-schedule transmission of the subsequent cells. In a further preferred aspect of the invention, the acknowledgment message may contain a bit-map identifying successfully-received and failed cells within the cell sequence, so that the AP need only re-schedule transmission of the failed cells.

SPECIFIC EMBODIMENTS AND BEST MODE OF THE INVENTION

Specific embodiments of the invention will now be described by way of example with reference to the drawings in which;

FIG. 4 shows the use of an offset pointer between downlink frames;

FIG. 5 illustrates the use of an offset pointer in a downlink frame header to locate the uplink frame structure;

FIG. 7 shows the use of an offset pointer within the extra uplink frame descriptor of FIG. 6;

FIG. 8 illustrates the structure of a downlink frame;

FIG. 10 shows the structure of a downlink frame including an extra uplink frame descriptor;

FIG. 11 illustrates the structure of a downlink frame and the use of an extra uplink frame descriptor;

FIG. 14 illustrates the use of training slots on the uplink;

FIG. 15 illustrates an upstream training burst transmitted by a SU;

SYSTEM FEATURES

The embodiments of the invention described below are implemented in a multi-user fixed wireless access (FWA) system, in which as many as 1,000 subscribers, or users, may be served from a single access point (AP). In a sectored-cell system, each sector of an AP may serve as many as 1000 subscribers. The system uses frequency-division duplex (FDD) spread-spectrum transmissions, such as code-division multiple-access (CDMA) transmissions. The downlink from the AP to subscriber units (SUs) carries both control information and data in asynchronous transfer mode (ATM) virtual channels (VCs) within a framed structure, as does the uplink from the SUs to the AP.

Physical Layer Synchronisation

Figure 1:
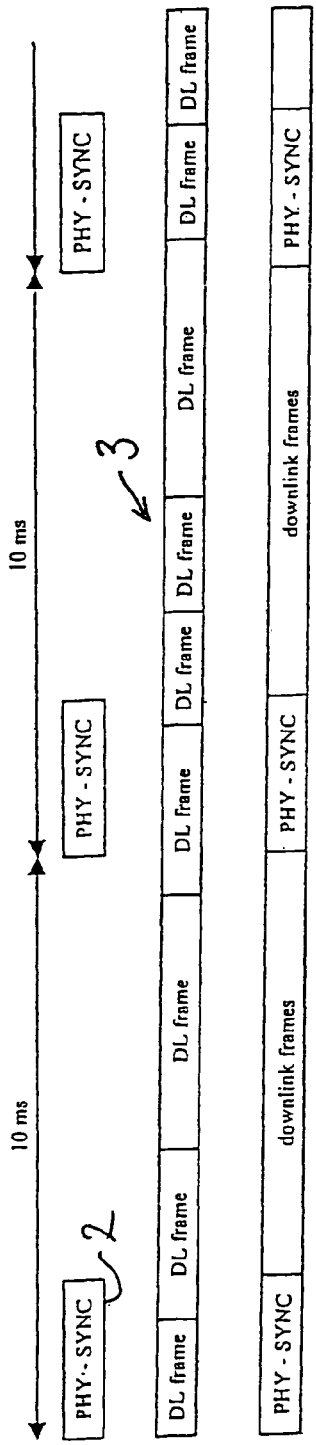
FIG. 1 illustrates variable-length downlink frames dispersed around physical layer synchronisation bursts.
Figure 2:
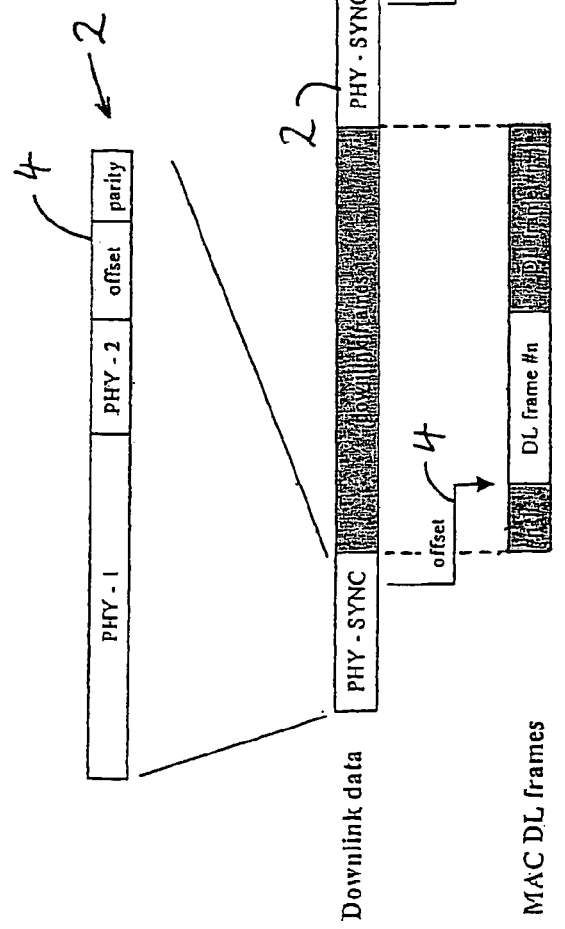
FIG. 2 illustrates the use of offset pointers within synchronisation bursts to locate downlink frames.

As shown in FIG. 1, the downlink transmitted by the AP carries physical layer synchronisation bursts (PHY-SYNC) 2 at exactly 10 ms intervals. FIG. 2 shows the structure of each synchronisation burst, comprising a 112-symbol correlation sequence PHY-1, a 16-symbol correlation sequence PHY-2, a 12-bit frame offset and 4 parity check bits. The term symbol refers to the symbols of the spread-spectrum communications system.

The correlation sequences PHY-1 and PHY-2 are used by each SU to lock onto the synchronisation bursts and as synchronisation and training sequences to set up receiver and modem parameters to match the transmission channel. To achieve synchronisation, software control at the SU receiver first sets an automatic gain control (AGC) level based on signal level outputs from the SU modem. The SU modem and medium access control (MAC) then initiate automatic frequency control (AFC), which has three different tracking modes. First, for example when a SU is first switched on or if it loses the channel, an acquire mode is used. In each synchronisation burst the correlation sequences are predetermined pseudo-random sequences, which are known to the SU. As the SU receives the downlink, a correlator output therefore produces maximums when the sequences are received. The acquire mode uses the timing offset between correlator maximums to initialise the AFC and thus to acquire the downlink channel.

Second, a coarse AFC mode maps the correlation maxima into one of 64 timing (T/4) slots and the AFC is adjusted until the correlation maximum is in the correct slot every time.

Third, a fine mode adjusts the shoulders of the correlation maxima to be even.

Locating the Downlink Frame Structure

Medium access control (MAC) at the AP transmits control information and subscriber data within frames, which are interleaved between the physical layer synchronisation bursts. A sequence of frames 3 and its arrangement around the synchronisation bursts are shown in FIG. 1. The frame length is variable and so the synchronisation bursts may appear at any point either between or within the frames.

Each SU can lock to the physical layer using the synchronisation bursts as described above. Each of these bursts 2 contains a 12-bit frame offset 4 as shown in FIG. 2, which is a pointer to the start of the next downlink frame. The offset is provided as a number of spread-spectrum symbols (a symbol count) and allows each SU to locate the start of the next downlink frame. FIG. 2 illustrates the offsets 4 between three consecutive synchronisation bursts and the start of each subsequent frame.

Figure 3:
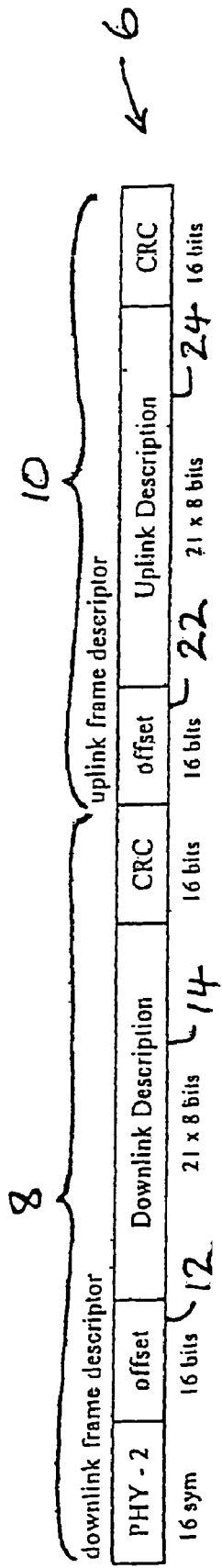
FIG. 3 illustrates a downlink frame header.

A header at the start of each downlink frame is modulated using quaternary phase shift keying (QPSK). FIG. 3 illustrates the structure of a downlink frame header 6. It comprises a downlink frame descriptor 8 followed by an uplink frame descriptor 10. The downlink frame descriptor starts with the same 16-symbol correlation sequence PHY-2 as is carried by each synchronisation burst. This allows a correlator at the SU positively to identify the start of the frame. The synchronisation sequence is followed by a 16-bit frame offset 12, which is a symbol count to the beginning of the next downlink frame; thus, once an SU has locked onto the frame structure, as long as it can continue to decode the frame structure it can synchronise with the start of each downlink frame without further direct reference to the synchronisation bursts. A downlink description 14 follows the offset 12 and describes the contents of the frame. The downlink frame descriptor ends with a 16 bit cyclic redundancy check (CRC).

FIG. 4 illustrates the use of the downlink (DL) frame offset 12 to refer from the header of one DL frame (frame #n) to the start of the next DL frame (frame #n+1). FIG. 4 shows only the MAC DL frames, omitting the synchronisation bursts.

Locating the Uplink Frame Structure

Uplink frames are not all the same length. Also, uplink frames need not be the same length as downlink frames, nor start at the same time.

As shown in FIG. 3, the uplink frame descriptor 6 carried in each downlink frame header contains a 16-bit uplink frame offset 22 followed by an uplink description 24 and a 16-bit CRC. FIG. 5 illustrates the uplink frame offset 22 which provides a symbol count from the current downlink frame to the start of the next uplink frame 26. As in FIG. 4, FIG. 5 omits the synchronisation bursts for clarity, showing only the MAC DL and uplink (UL) frames.

The offset between the downlink frame header and the start of the next uplink frame will vary at each SU depending on the distance between the AP and the SU, due to propagation delays. In a preferred embodiment, therefore, the uplink frame offset 22 is the offset experienced by an SU at the maximum range of the AP and each SU must add to the offset a delay dependent on its own range from the SU.

Figure 6:
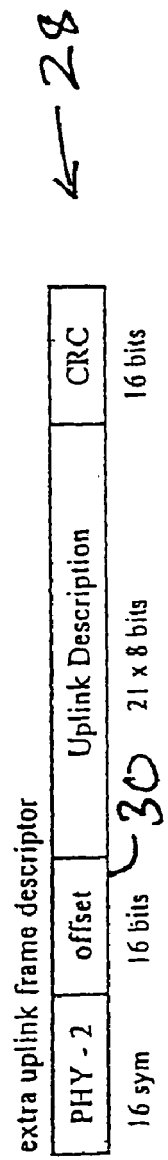
FIG. 6 shows an extra uplink frame descriptor.

If downlink frames are significantly longer than uplink frames at any time, for example due to the traffic load on the downlink and uplink, then providing only one uplink frame descriptor in each downlink frame may result in a disadvantageously low utilisation of the uplink. Extra uplink frame descriptors can therefore be inserted into the downlink frames under these circumstances to announce the start of new uplink frames. FIG. 6 shows the structure of an extra uplink frame descriptor 28, which is identical to the uplink frame descriptor 10 shown in FIG. 3 forming part of a downlink frame header except that, like all uplink bursts, it starts with a PHY-2 correlation sequence to improve synchronisation at the AP. FIG. 5 showed the use of a single uplink frame offset in a downlink frame header to indicate the start of the subsequent uplink frame 26. FIG. 7 is a similar drawing showing a much longer downlink frame (DL frame #n) carrying a first uplink frame offset 22 in its header and an extra uplink frame offset 30 amongst the data carried by the downlink frame. The extra uplink frame descriptor is always modulated using QPSK so that all SUs can demodulate it, even if it surrounded by higher modulations as described below.

Downlink Frame Structure

Following the header, each downlink frame carries bursts of information for SUs, which may include ATM cells or acknowledgments (see below). As mentioned above, downlink headers are modulated using QPSK. Other bursts of information may be modulated differently, for example using 16-QAM or 64-QAM, but in each frame these modulations must be in ascending order. Thus, downlink frame #n in FIG. 8 contains, following the QPSK header, QPSK acknowledgments (ACKS) and ATM cells 16, 16-quadrature-amplitude-modulation (QAM) ACKs and cells 18 and then 64-QAM ACKs and cells 20. Different SUs may have different modem capabilities. All must be able to demodulate QPSK modulation but SUs may incorporate modems having higher performance for demodulating 16-QAM or 64-QAM modulation. Hence, not all SUs can be guaranteed to demodulate the entire frame but all can demodulate the QPSK header, including the downlink frame descriptor 8.

If a modem which is only capable of demodulating QPSK attempts to demodulate a frame carrying higher modulations, as illustrated in FIG. 8, phase lock and decision feedback equaliser (DFE) feedback tap synchronisation will be lost because an attempt to demodulate higher order modulations will generate a very high Symbol Error Rate (SER), which prevents the DFE from operating. However, SUs which can only demodulate the lowest modulation used by an AP can maintain symbol synchronisation by using the QPSK synchronisation bursts.

As described above with reference to FIG. 3, the downlink frame descriptor 8 carried in the header 6 of each downlink frame carries a training sequence PHY-2, a downlink frame offset 12, a downlink description 14 and a 16-bit CRC.

PHY-2 is used to train the back-end digital-phase locked loop (D-PLL) of each SU modem and to load the DFE feedback taps. This may not always be necessary but will be required if the previous frame contained sections of higher order modulations which caused some SUs to lose DFE/D-PLL synchronisation.

The downlink offset is the symbol count to the start of the next downlink descriptor, that is the start of the next downlink frame, as described above.

Figure 9:
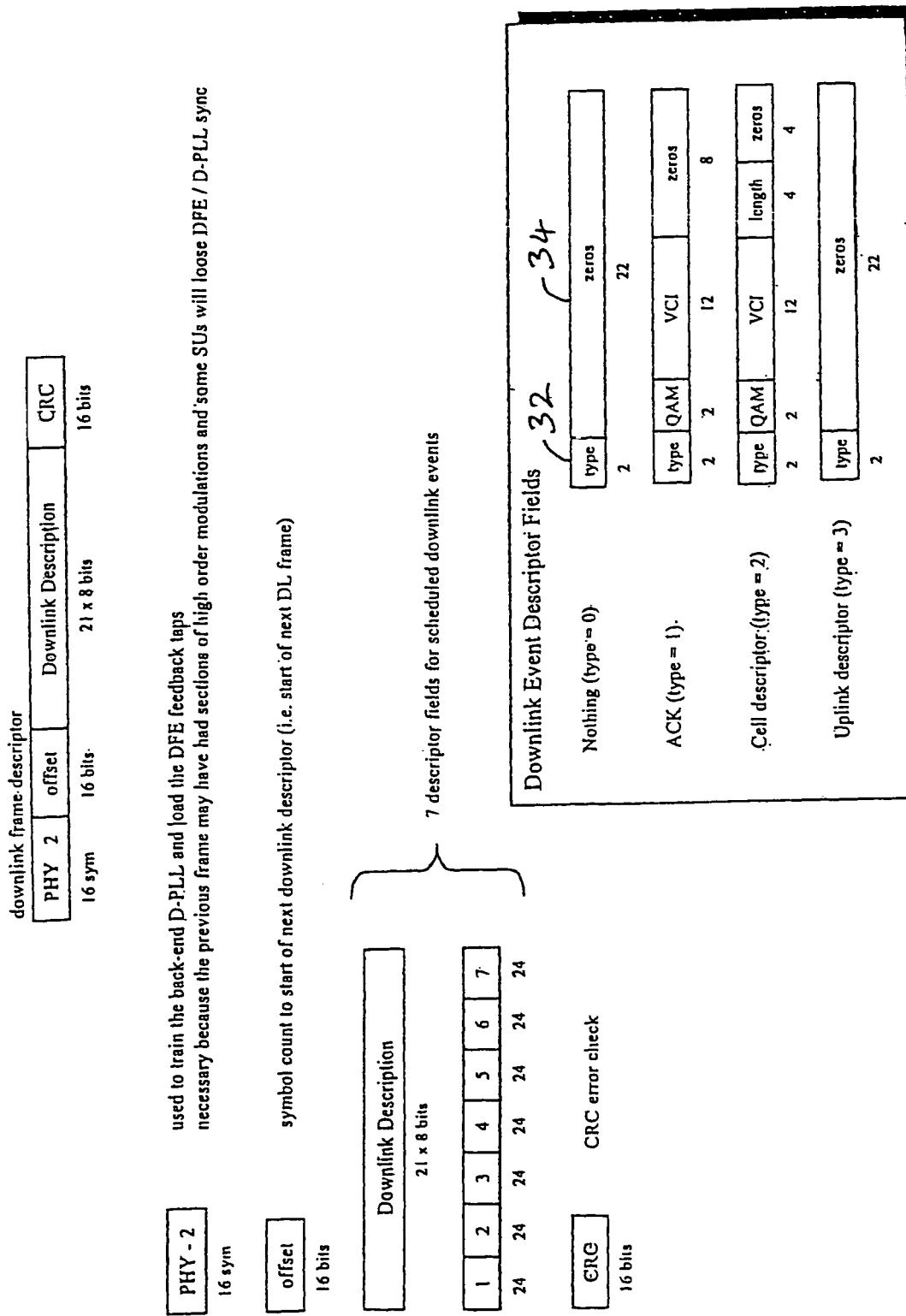
FIG. 9 illustrates the use of downlink event descriptor fields within a downlink frame header.

The downlink description 14 contains 21 8-bit bytes and provides seven 24-bit descriptor fields for scheduled downlink events within the downlink frame. FIG. 9 illustrates the four types of downlink event which can be scheduled, numbered as type 0 to type 3. The type number is carried in two bits 32 at the head of each descriptor field. Type 0 is used to pad the downlink description if the frame contains less than 7 scheduled events, and contains only zeros. Type 1 describes an acknowledgement (ACK) event, for which the descriptor carries a two bit modulation-type identifier QAM and a twelve bit ATM virtual channel identifier (VCI). Downlink event type 2 is the transmission of an ATM cell. In this case the descriptor identifies the modulation type (QAM), two bits, ATM VCI, twelve bits, and the length of the cell, four bits. Type 3 describes an extra uplink frame descriptor; these all have the same structure and so no information is required in the downlink event descriptor field, which is zero padded. The order of the seven descriptor fields in the downlink description matches the order of the downlink events in the frame.

In total, there are three types of downlink event, cells (type 2), acknowledgements (type 1) and extra uplink frame descriptors (type 3). Downlink and uplink frame descriptors must always be in the lowest order modulation supported by the AP, e.g. QPSK. Clearly, therefore, an extra uplink frame descriptor appearing in the latter portion of a frame may breach the rule that modulations must be in ascending order. SUs should still be able to identify the extra uplink frame descriptor by identifying the correlation sequence PHY-2 at its start.

FIG. 10 illustrates a downlink frame containing a header 6 followed by acknowledgements and cells in increasing orders of modulation, and a downlink frame additionally containing an extra uplink frame descriptor 28 amongst higher order modulations.

FIG. 11 illustrates an uplink frame offset within a downlink frame header in more detail, expanding the contents of a downlink frame (DL frame #n) and the downlink frame header as in FIG. 8, and then showing the link provided by the uplink frame offset 22 to the start of the next uplink frame (UL frame #n+1).

Each downlink frame may carry bursts for SUs using different modulations. Hence any given SU can only be guaranteed to demodulate the QPSK DL frame descriptor. Each uplink frame descriptor contains a pointer to the start of the next UL frame so that the SU can locate it even if it cannot demodulate the higher modulations.

As described above, the downlink frame header includes an uplink frame descriptor. This is implicit and need not be described in the downlink event descriptor field.

Uplink Frame Structure

There are no standard uplink frame structures, but in general each uplink frame will contain a contention slot, an uplink request, upstream acknowledgements and upstream cells. Wide and narrow training slots and polling signals may also be present. The functions of these frame elements, or events, are described below.

Figure 12:
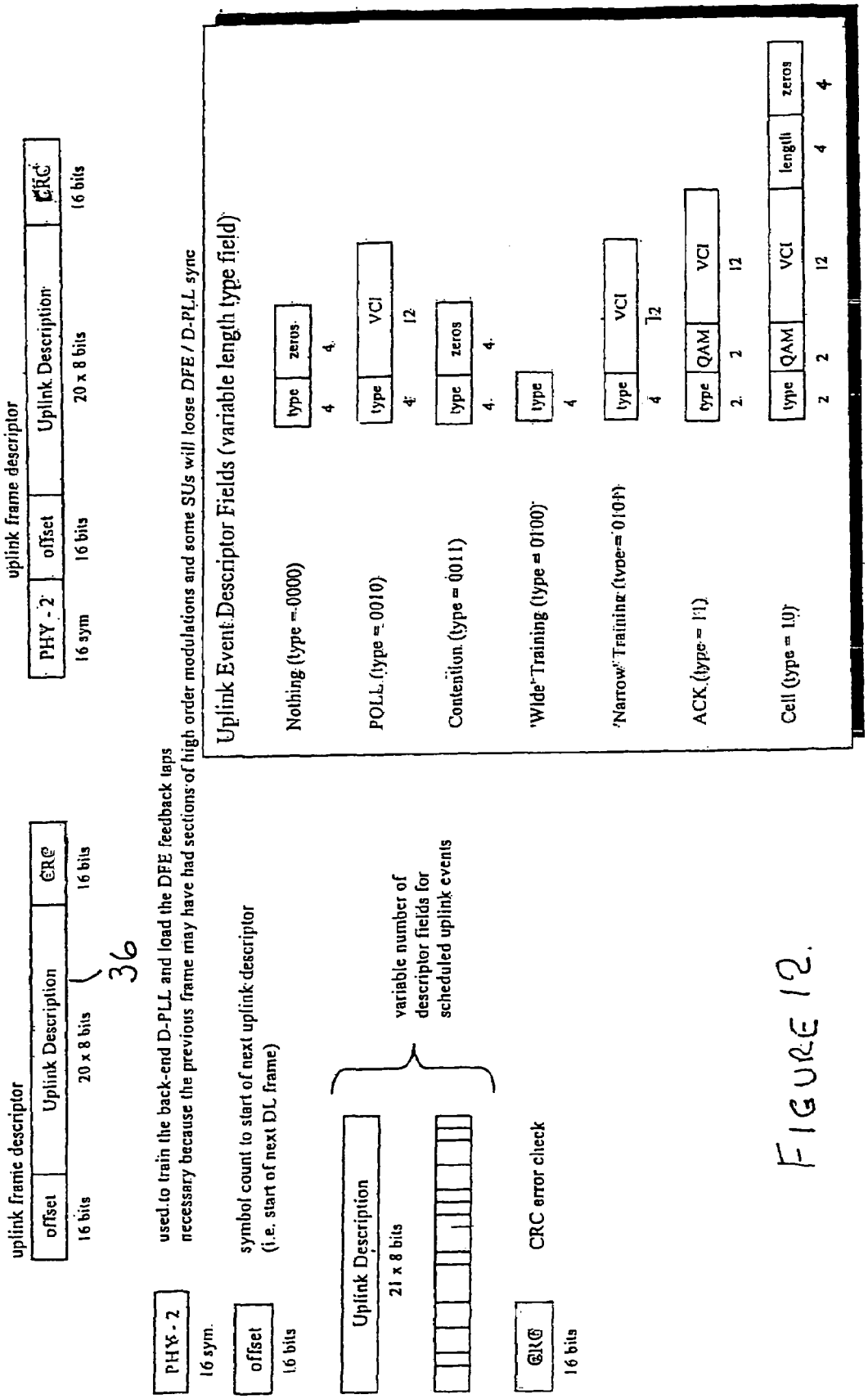
FIG. 12 illustrates uplink event descriptor fields contained within uplink frame descriptors.

As described above, uplink frame descriptors are carried on the downlink, either within downlink frame headers or as extra uplink frame descriptors. FIG. 12 illustrates the structure of an uplink frame descriptor, and in particular the uplink description 36. The uplink description comprises 21 8-bit bytes, providing a variable number of descriptor fields for scheduled uplink events. There are 6 types of uplink events.

There are 7 types of descriptor, including type 0000 for padding the uplink description if required. Type 0000 contains the four bit type number followed by a further four zeros. A polling event is indicated by a type 0010 descriptor; the descriptor carries the four bit type number 0010 and a twelve bit ATM VCI. A contention event (slot) descriptor comprises a four bit type number 0011, and indicates a contention slot in which SUs may contend for access to bandwidth; this descriptor field contains the type number 0011 followed by four zeros. Type 0100 indicates wide training slot, in which SUs can transmit training sequences; this descriptor field contains only the four bit type number 0100. Type 0101 indicates a narrow training slot for SUs to transmit training sequences; this descriptor field contains the four bit type number 0101 and a twelve bit ATM VCI. Type 11 is an acknowledgment event; the descriptor field contains the two bit type number 11, a two bit modulation order identifier and a twelve bit ATM VCI. Type 10 indicates the transmission of a cell by a SU; this descriptor field contains the two bit type number 10, a two bit modulation level indicator, a twelve bit ATM VCI and a four bit indication of the length of the cell, followed by four zeros.

Figure 13:
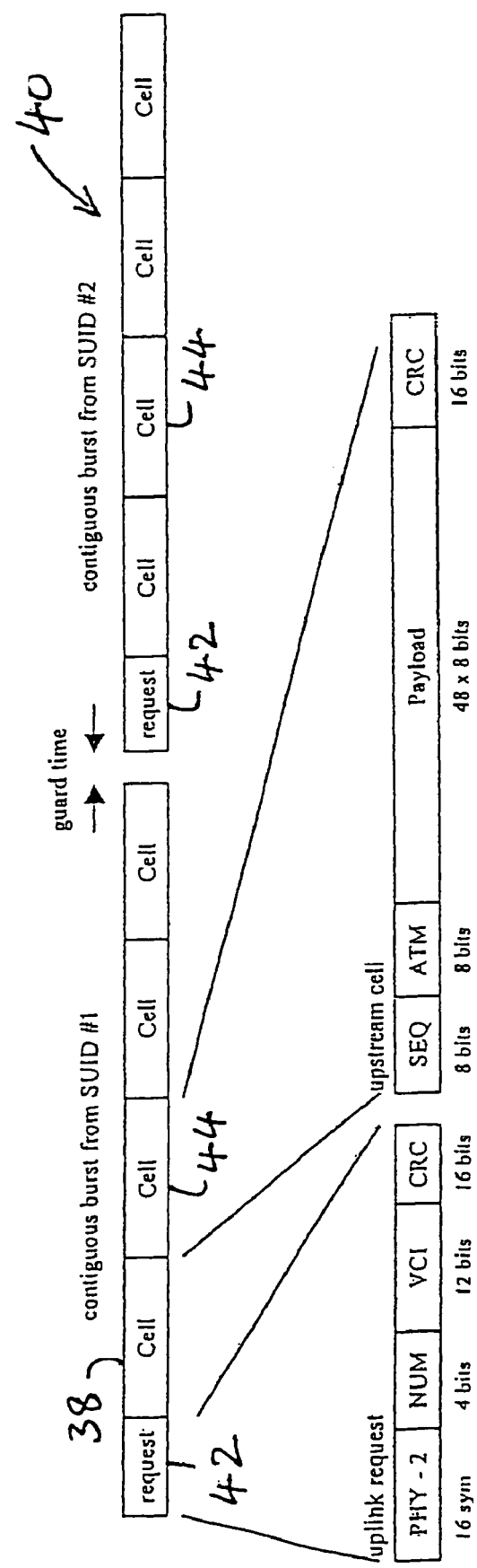
FIG. 13 illustrates the uplink structure.

These fields within the uplink description specify the contents of the next uplink frame, the start of the frame being indicated by the uplink frame offset preceding the uplink description. FIG. 13 shows a portion of an uplink frame. Uplink cells are sent in bursts from each. SU wishing to transmit. The bursts have been scheduled using cell descriptors in the uplink description (see FIG. 12). FIG. 13 shows bursts 38, 40 from SUs #1 and #2. The bursts are separated by a guard time to prevent collision. The cells are conventional ATM cells except that they do not need to carry the VCI, which has already been transmitted in the cell descriptor. An implicit uplink request 42 starts each burst, and is followed by a number of cells 44. Each uplink request starts with a training sequence PHY-2, to allow the AP to resolve phase uncertainty and train its DFE feedback taps, followed by a 4-bit field indicating the number of cells to be transmitted (NUM), a twelve bit VCI and a sixteen bit CRC. In fact, the VCI and NUM fields are superfluous and could be omitted because, as described below, the AP has already assigned an ATM VCI and a number of cells to the transmitting SU and can identify the VCI of the following cells and the identity of the SU from the position of the cells within the uplink frame. However, the transmission of the full uplink request improves synchronisation at the AP and so advantageously increases reliability on the uplink.

Uplink Training—Mechanism

When a SU first switches on, or first registers with the AP, it may not know the distance between itself and the AP. It can receive and lock on to downlink signals but the transmission delay arising from its range from the AP affects the offset it sees between the downlink and uplink signals. Initial timing compensation to account for this transmission delay may be termed pre-delay compensation.

Pre-compensation slots, or wide training slots as referred to in FIG. 12, are scheduled relatively infrequently in uplink frames. This is because they need to have a length of double the maximum propagation delay between the AP and any SU plus the length of a training burst to be transmitted by a SU, and so consume significant bandwidth. FIG. 14 illustrates an uplink frame containing a wide training slot 46 and also shows the wide training slot in more detail. FIG. 15 shows the structure of an upstream training burst 48.

To allow pre-delay compensation, the AP MAC schedules a wide training slot, using the uplink frame descriptor, and any SU requiring delay compensation transmits an upstream training burst in the wide training slot. When so doing, the SU assumes that the propagation delay is zero. Consequently, the AP receives each SU's training burst at a time after the beginning of the wide training slot equal to double the propagation delay between the AP and the SU (since the delay affects both the downlink and the uplink). As shown in FIG. 15, each upstream training burst includes the identity of the SU which sent it (SUID) 50, and so the AP can inform each SU of its propagation delay.

When a SU transmits an upstream training burst, it may not previously have received any feedback from the AP to allow it to calibrate its transmission power or equalisation to compensate for the channel. To try to ensure that the AP can decode the upstream training burst, the SU therefore uses an estimated transmission power and pre-distorts the training burst as follows.

The SU can receive the downlink signal; and can therefore generate a received signal strength indicator (RSSI). To assess its initial transmission power, it also needs to know the AP's transmission power. This is broadcast by the AP on a regular basis, as described below. In order to pre-distort the upstream training burst, the SU evaluates the downlink signal and assumes that the uplink and downlink channel characteristics are the same. Pre-distortion techniques such as those described in U.S. Pat. No. 6,031,866 or international patent application number PCT/GB00/00589 may be used.

As shown in FIG. 15, each uplink training burst starts with the one hundred and twelve symbol PHY-1 and sixteen symbol PHY-2 correlation sequences, followed by the sixteen bit SUID. The correlation sequences are known to the AP and so can be decoded relatively readily, even if the SU's power and pre-distortion assessments are inaccurate.

After initial delay-compensation training, a SU should not need to use wide uplink training slots. Regular uplink re-training for delay-compensated SUs can then be scheduled within the normal uplink structure using narrow training slots 47. A delay-compensated SU can send an upstream training burst within a narrow training slot, for use by the AP to feed back information to the SU to improve its transmission power control and equalisation.

Uplink Training—Protocol

Figure 16:
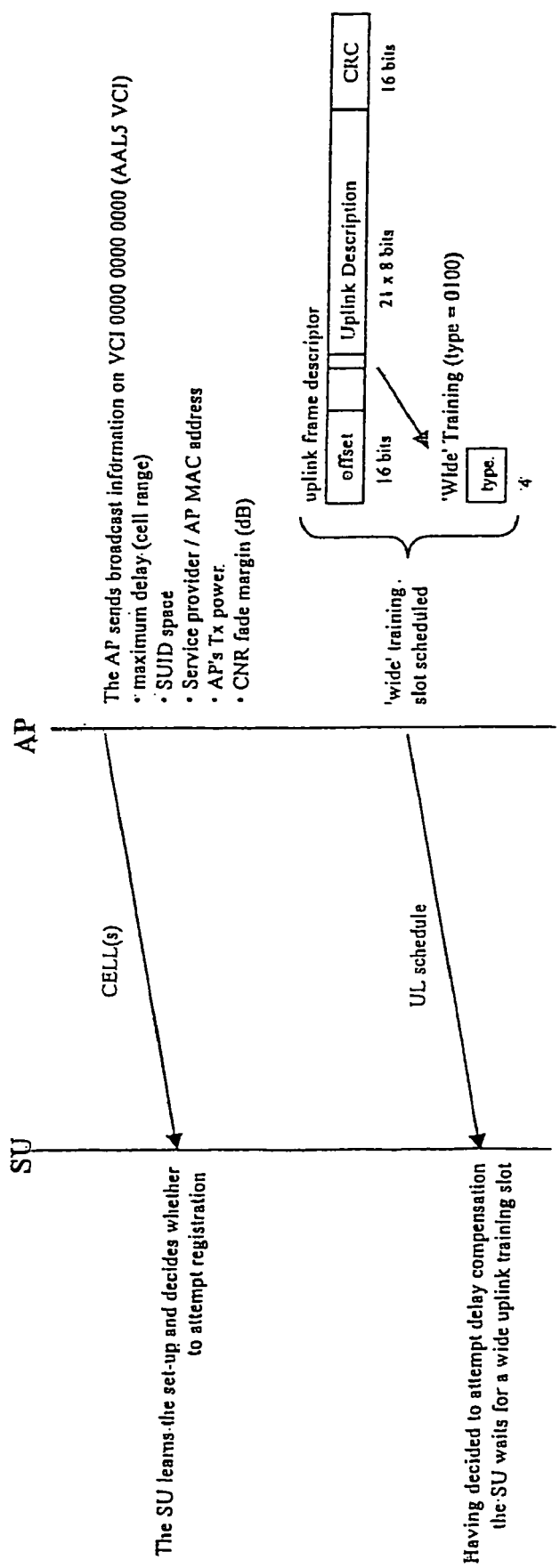
FIG. 16 illustrates the initial stages of SU registration protocol.

FIG. 16 illustrates the transmission of a broadcast by the AP carrying information required by the SU to attempt registration, if desired, followed by the scheduling of a wide training slot using the uplink frame descriptor. The broadcast information includes the identity of the AP or service provider, the maximum delay (cell range), the AP's transmit power, CNR fade margin, and SUID space. An SU may be located so that it can receive signals from more than one AP or in more than one AP sector, but it may only be registered for communications with one of these. When it locks on to a downlink signal, receiving the AP or service provider identity therefore prevents it attempting an incorrect registration.

Figure 17:
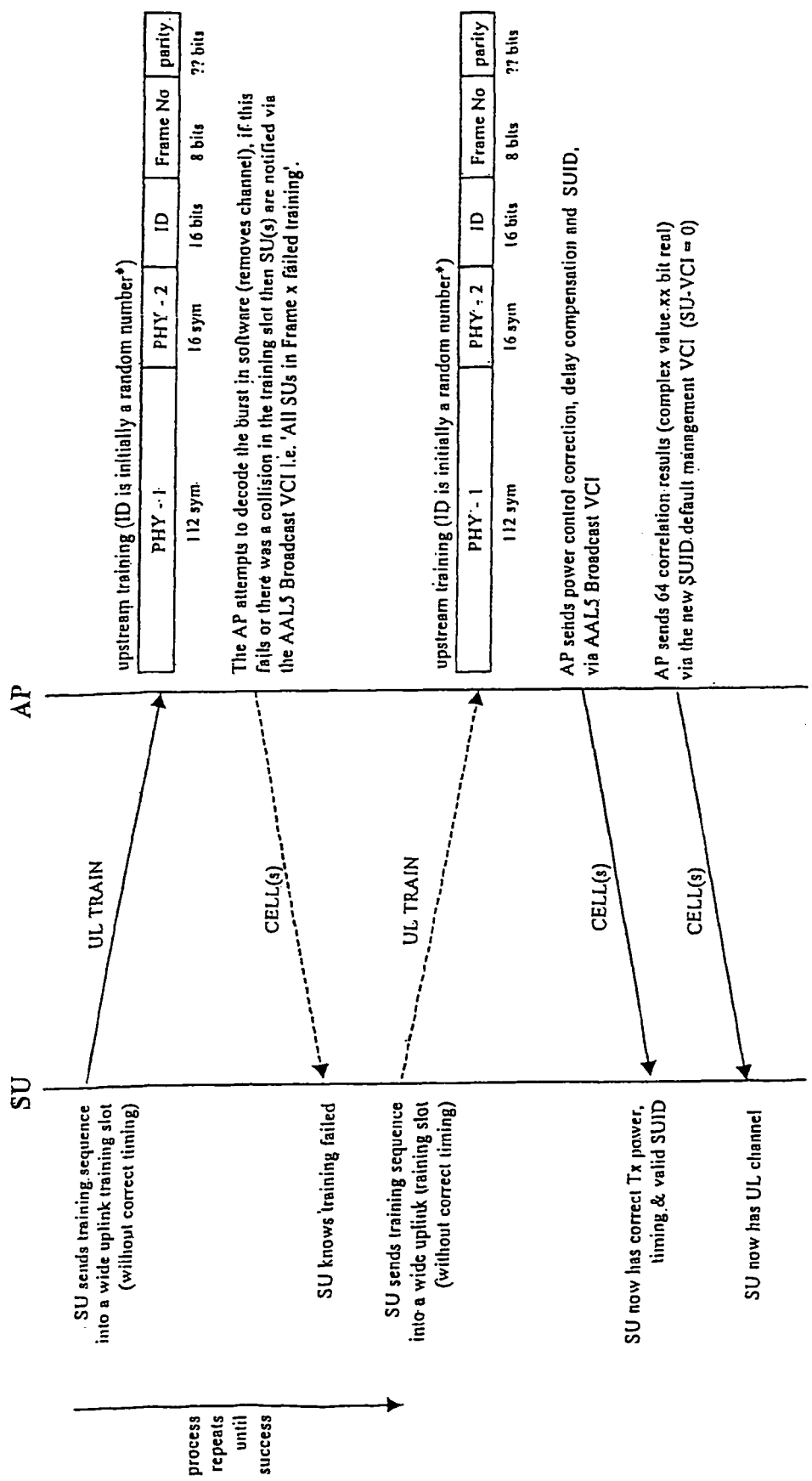
FIG. 17 illustrates the SU training protocol.

FIG. 17 illustrates the protocol for synchronisation using a wide training slot. When such a slot has been scheduled as shown in FIG. 16, if a SU wishes to train it sends an upstream training burst into the wide slot. The AP attempts to decode the burst in software. If it fails, or if there was a collision between upstream training bursts from two or more SUs in the training slot, then SUs are notified using the AAL5 broadcast VCI. The broadcast message communicates that all SUs in a specific numbered frame failed training. On receipt of such a broadcast, the SU knows that training failed and so it sends a further training burst in a later wide training slot, after a random backoff period.

If the AP successfully decodes an upstream training burst, it sends a broadcast message containing the SUID of the SU together with power control correction and delay compensation information. This gives the SU the correct transmission power, timing and a valid SUID. The AP then sends 64 correlation results on the new SUID default management VCI (SU–VCI=0). This gives the SU the uplink channel.

During the training procedure, the AP thus assigns a SUID to the SU. The SUID initially included by the SU in its training sequence is a random number. After an upstream training burst has been successfully decoded, the AP assigns a SUID to the SU for use in further communications.

Equalisation Strategy

A SU only has to communicate with one AP whereas an AP, in the embodiment, may have to manage up to 1,024 SUs. It is desirable to achieve efficient medium access control, with short transmitted bursts and contention on the uplink. A real time equaliser strategy would disadvantageously require too many training symbols at the start of each uplink burst. The embodiment therefore uses off-line equalisation with regular retraining and has the majority of complexity dispersed among the SUs. Thus, the initial training phase using the wide training slots allows the SU and AP to resolve the uplink and downlink channels. On receipt of upstream training bursts, the AP pre-loads the correct post-cursor taps for each SU.

Each SU then pre-distorts its subsequent scheduled transmissions to reduce pre-cursor distortion and decrease noise. For uplink contention (which is not scheduled for individual SUs), as described below, each SU fully pre-distorts its contention burst so that the AP does not require an equaliser, or any inherent knowledge of which SU is sending a particular contention burst.

Figure 18:
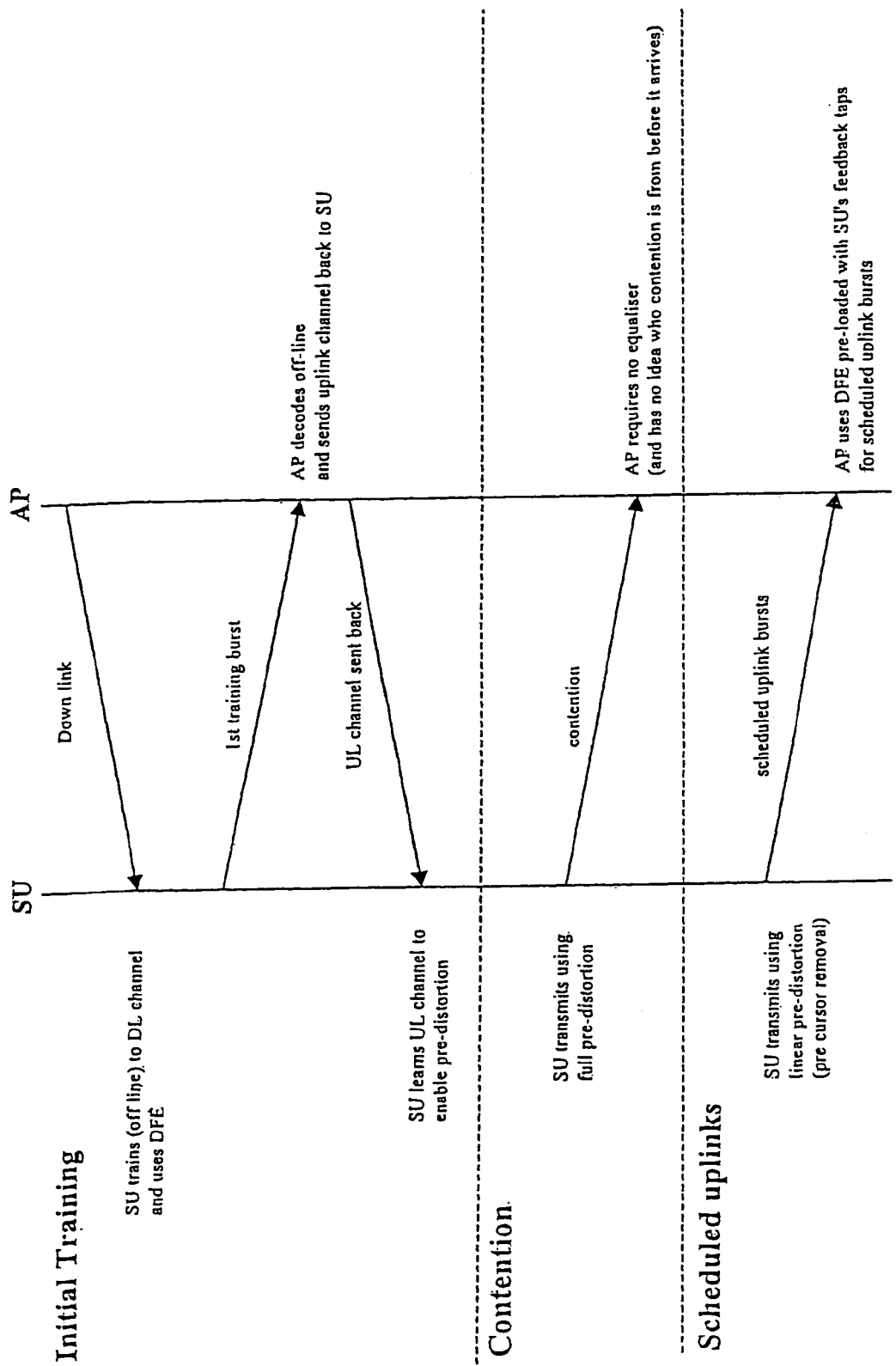
FIG. 18 shows the SU contention protocol.

The equalisation strategy is illustrated in more detail in FIG. 18, which shows that the AP only has fully to equalise training bursts, which are relatively infrequent. As shown in FIG. 18, the AP broadcasts the downlink signal and the SU trains offline to the downlink channel. Using a DFE and estimating an initial transmission power as described above, the SU pre-distorts a first training burst which is transmitted in a wide training slot. The AP decodes the training burst offline and sends details of the uplink channel back to the SU, using the SUID in the training burst. This enables the SU to learn the uplink channel characteristics and improve its pre-distortion of further transmissions. When a SU subsequently transmits contention bursts, as described below, the AP does not know which SU is sending the contention burst: before it arrives. The SU therefore transmits contention bursts using full pre-distortion so that the AP does not need to use an equaliser. When a SU subsequently transmits a scheduled uplink burst, as described below, the AP knows which SU is sending the burst and can therefore decode it using a DFE pre-loaded with the individual SU's feedback taps. The SU therefore transmits scheduled uplink bursts using linear pre-distortion (pre-cursor removal).

SUID/VCI Relationship

Each AP and SU contains an ATM cell switch/multiplexer which passes ATM cells from a receive port either into the MAC, into a control module (RAMP) or out of the transmit port of the wired side. These options are numbered 3, 2 and 1 respectively in the block diagrams of the AP and SU in FIG. 19.

Figure 19:
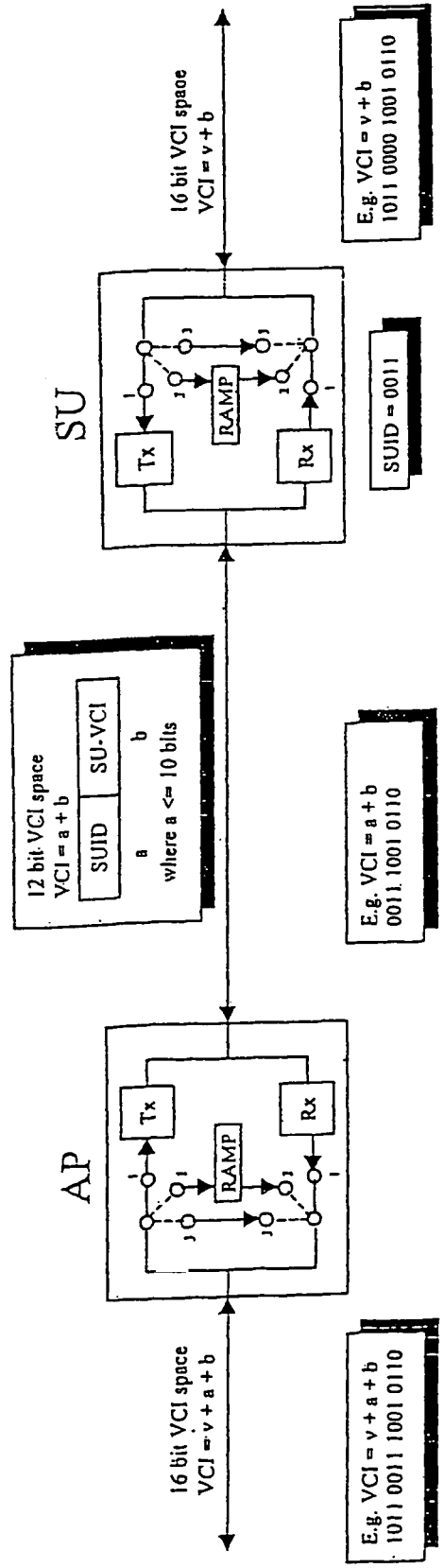
FIG. 19 is a block diagram of the structure of AP and a SU illustrating the use of VCI addressing.

A default VCI is used for each SU for RAMP control. This VCI is only recognised on wired ports and at power up has the same default value for each unit, which may be reassigned once the SU is under the local control of either an access point concentrator (APC) or customer premises equipment (CPE). A 16-bit VCI mask (v) is used to select the VCI space for the AP, or for a sector of the AP in a multi-sector system. On-air VCIs are a 12-bit VCI sub-set. The following example illustrates the use of the VCI mask to generate VCI addresses for different portions of the system, as illustrated in FIG. 19.

EXAMPLE

VCI 1011 0011 1001 0110 VCI on AP's wired port
mask(f) 1111 0000 0000 0000 system mask (configurable)
mask(v) 1011 0000 0000 0000 Sector mask value i.e. VCIs for this AP and its SUs
VCI & f 1011 0000 0000 0000 VCI & f
VCI & v 1011 0000 0000 0000 VCI & f-VCI & v, hence this VCI is for this sector
NOT f 0000 1111 1111 1111
VCI & NOT f 0000 0011 1001 0110 yields 'on air VCI'–a+b, where
a 0011 SUID (for this sector a is 4 bits wide)
b 1001 0110 SU-VCI
v+b 1011 0000 1001 0110 VCI on SU's wired port (NB SUID independent)

Broadcasting

When a SU first locks onto an AP's transmissions, it cannot tell whether that AP is on its own network and it has no knowledge of physical layer parameters such as the AP's transmission power or the maximum cell radius, which are necessary for initial uplink power control and delay compensation. A broadcast VCI is used to allow unregistered SUs to learn about the network and the physical layer. At intervals, the downlink contains AAL5 cells on a pre-determined broadcast VCI. Thus, as illustrated in FIG. 16, the AP sends broadcast information on VCI 0000 0000 0000 (AAL5 VCI). The information comprises the maximum AP-to-SU delay (the AP's cell range), the SUID space used in the cell, the AP MAC address and/or the address of the service provider operating through the AP, the AP's transmission power and a carrier-to-noise ratio (CNR) fade margin in dB.

Periodic Uplink Retraining

Figure 20:
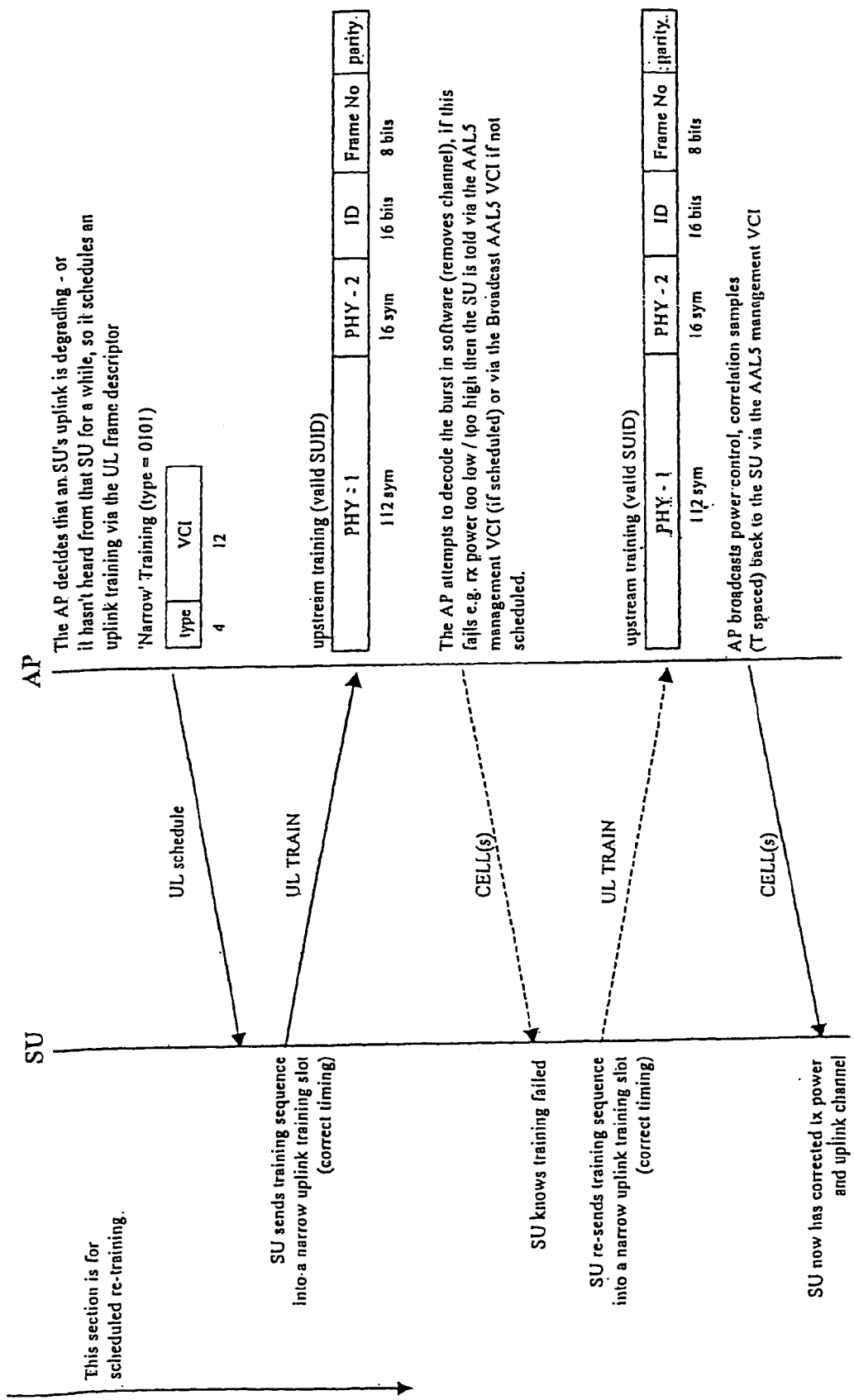
FIG. 20 illustrates the training protocol for SUs using narrow training slots.

Since the system of the embodiment employs off-line equalisation, changes in the channel may not be tracked by SUs. Regular retraining is therefore desirable. This can be initiated either by the AP scheduling a particular SU for retraining or by an SU autonomously retraining in a wide uplink training slot. FIG. 20 illustrates the procedure for scheduled retraining.

If the AP decides that a SU's uplink is degrading or if it has received no uplink communications from a SU for more than a predetermined time, it schedules an uplink training event by sending an uplink frame descriptor of type 0101 (narrow training slot) identifying the SU. The SU then sends an upstream training burst in the narrow uplink training slot. The AP attempts to decode the burst in software, by removing the channel. If it succeeds, the AP broadcasts corrected power control information and correlation samples back to the SU using the AAL5 management VCI. The SU now has corrected transmission power and uplink channel parameters. If the AP cannot decode the upstream training burst, then it informs the SU accordingly, and the SU will re-initialise and try to regain communications.

Recovering Synchronisation

Figure 21:
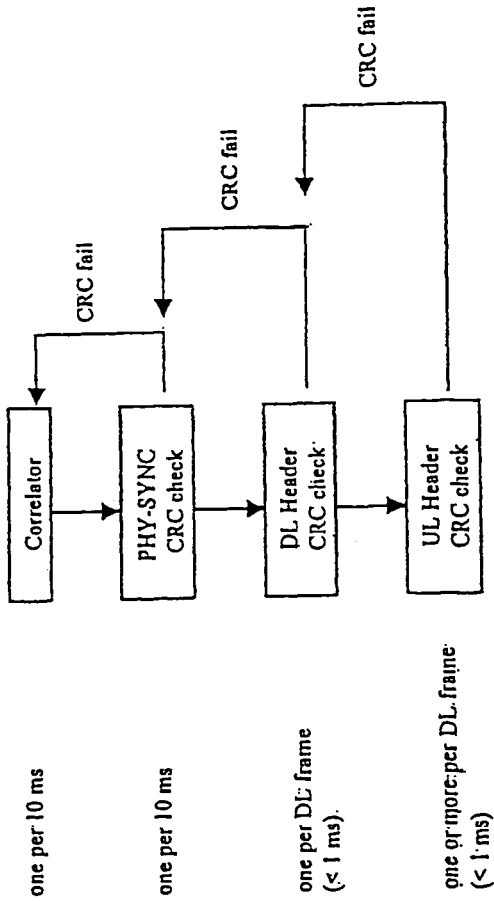
FIG. 21 shows the synchronisation hierarchy of the communications system.

Each SU seeks to maintain synchronisation by looking for correlation sequences and frame offsets in the downlink. Each downlink burst containing an offset pointer also contains a CRC for error checking. If a CRC check fails, then the SU will be unable to use the offset pointer to find the next frame. In that event, the SU needs to revert back to the previous level of the frame hierarchy to re-synchronise, as illustrated in FIG. 21. Thus, if a CRC, or parity check, fails on decoding a downlink synchronisation burst, the SU reverts to searching for the next correlation peak generated by a synchronisation sequence. If a CRC check fails on decoding a downlink frame descriptor 8, the SU reverts to looking for the offset in a downlink synchronisation burst. If the CRC check on an uplink frame descriptor 10 fails, the SU reverts to look for the next downlink frame descriptor.

Scheduling Downlink Traffic

Figure 22:
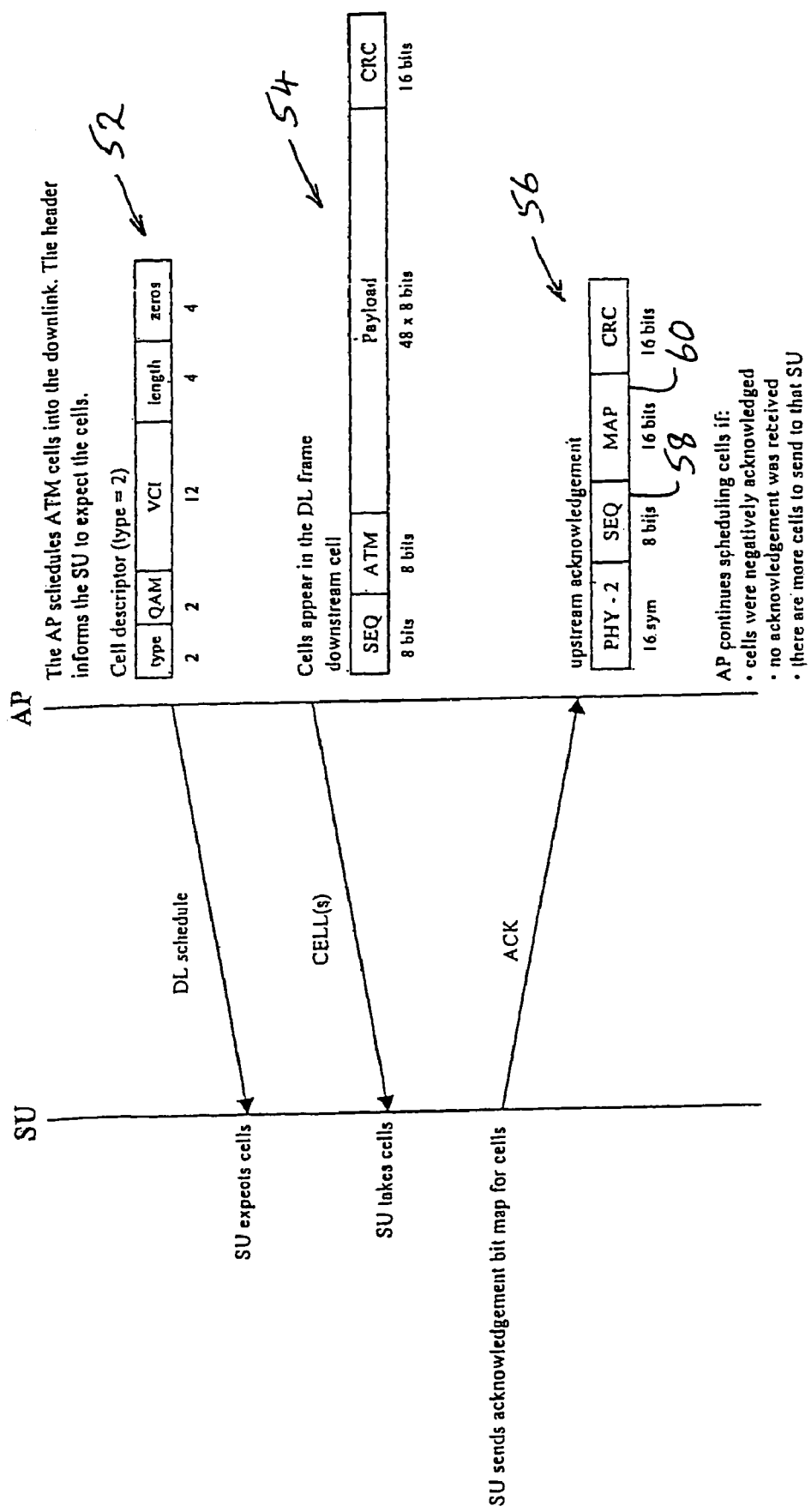
FIG. 22 illustrates the transmission of cells and acknowledgments on the downlink.

When ATM cells are to be sent to a SU, for example to carry data addressed to the SU or control information from the AP, the AP schedules the cells into the downlink as illustrated in FIG. 22. In the downlink description 14 for the frame in which the cells are to be sent, the AP inserts a cell descriptor 52 of type 2 (see FIG. 9). The cell descriptor contains the modulation level to be used for the cells, which will depend on the SU's modulation capabilities, a 12-bit VCI address and the length of the message (number of cells) to be sent. The VCI contains the SUID for the SU to which the cells are to be sent, and so after receiving the cell descriptor, the SU expects to receive the cells later in the frame. The AP then sends the cells 54 as scheduled in the downlink frame. The cells are conventional ATM cells except that they do not need to carry the VCI, which has already been transmitted in the cell descriptor. The SU receives the cells and sends an upstream acknowledgment 56 on the uplink.

As shown in FIG. 22, the upstream acknowledgment starts with a sixteen symbol correlation sequence PHY-2. It then carries an eight bit sequence number (SEQ) 58 and a sixteen bit bit map (MAP) 60, which indicate to the AP whether any of the cells sent on the downlink were lost or improperly received. The ATM cells sent on the downlink were sequentially numbered using the SEQ field. The SEQ field 58 in the upstream acknowledgement carries the SEQ number of the first cell in the sequence which was not properly received. Thus, if 8 cells were sent and the fourth, fifth and seventh were not properly received, the SEQ field in the upstream acknowledgement would carry an SEQ value of 4. The bit map 60 then carries a bit map of the subsequent cells in the sequence, a value of 1 indicating a successfully received cell and a value of 0 indicating an improperly received cell. Thus, in the example given above, the bit map field would carry the bit map 0101, indicating that the fifth and seventh cells had not been received. (In an alternative embodiment, the bit map may end with the last cell which was improperly received, it being implicit that subsequent cells were satisfactorily received. The bit map in the foregoing example would then read 010. In a second alternative, the last improperly received cell could similarly be omitted from the bit map, giving the shorter bit map 01 in the example). On receipt of the upstream acknowledgment, the AP schedules the re-sending of any cells identified in the upstream acknowledgement as not received. If no acknowledgment is received, the AP schedules to re-send all of the cells. If an acknowledgement indicates that all cells have been received, the AP takes no further action.

It is important that the system can recover from errors in the downlink cell process. At each stage of the downlink access state-machine (sending downlink schedule, sending cells, receiving acknowledgement) there is a possibility of a burst being lost or corrupted. The acknowledgement procedure allows recovery as the AP will re-schedule and re-send cells until it has received a satisfactory acknowledgment.

Requesting Uplink Access

A SU can gain access to the uplink by two methods; contention and polling. Polling is only used for real-time services. Both methods result in the AP polling the SU for its bandwidth allocation, as contention conveys no bandwidth details, but only a SUID.

Figure 23:
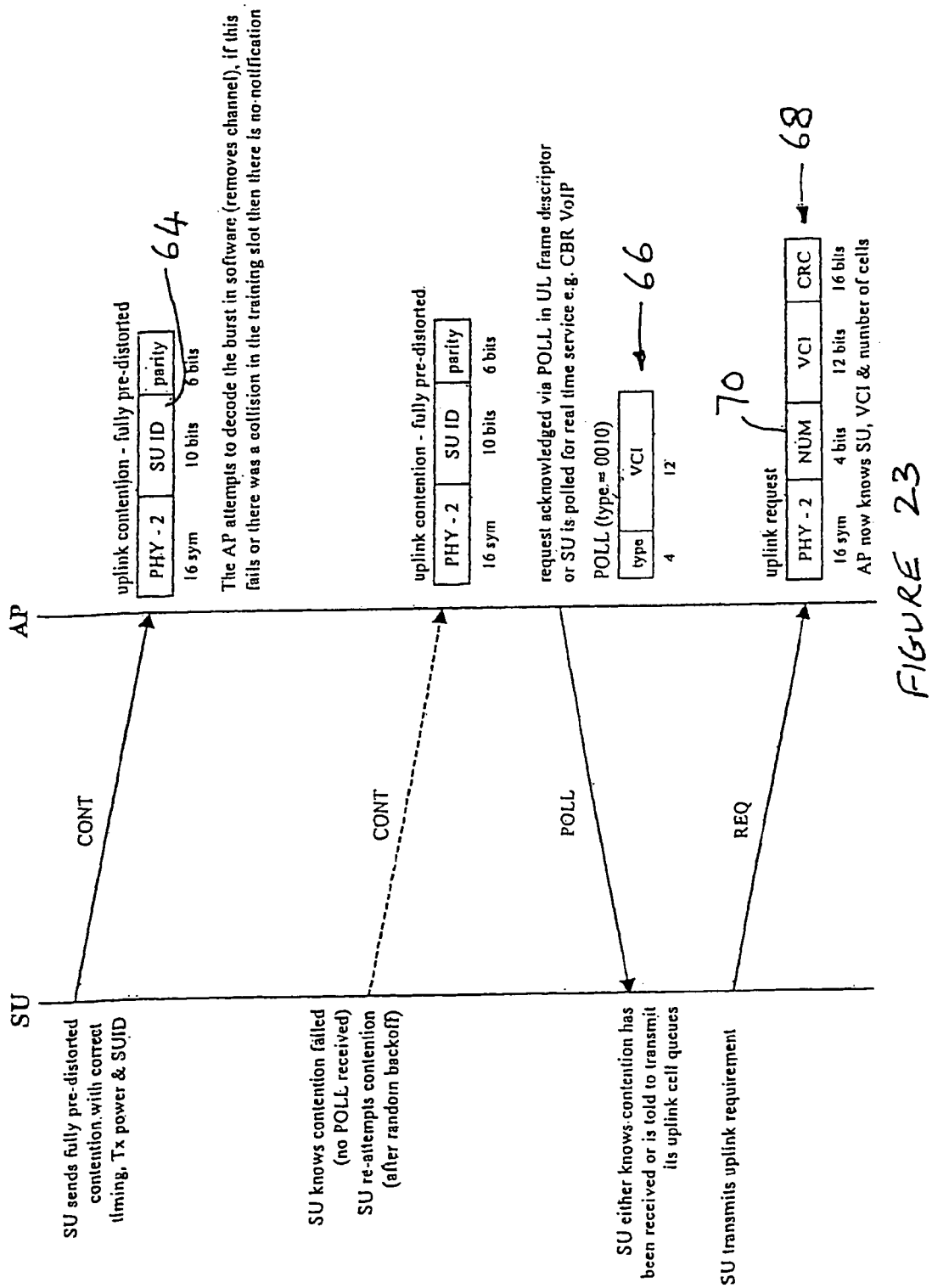
FIG. 23 illustrates the contention protocol for a SU wishing to transmit on the uplink.

FIG. 23 illustrates the contention procedure. If a SU wishes to send cells on the uplink, it first sends a fully pre-distorted uplink contention burst with (approximately) correct timing and transmission power in a narrow training/contention slot, as described above. The contention burst contains a correlation sequence PHY-2 followed by the SU's SUID 64 and 6 parity check bits. The AP attempts to decode the contention burst in software. If it fails, or if there was a collision between bursts sent by two SUs in the same training slot, then the AP takes no further action. If the SU receives no response from the AP, it assumes that its contention has failed and re-attempts contention after a random backoff time.

If the AP successfully decodes the uplink contention burst, it acknowledges the SU's request by means of a POLL 66 in the uplink frame descriptor 10 of a subsequent frame. This is an event descriptor of type 0010 as shown in FIG. 12. The POLL 66 carries a 12-bit VCI, which the SU uses to transmit its uplink access requirement. This uplink request 68 contains the number of cells 70 required by the SU and the VCI provided by the AP.

Scheduling and Acknowledging Uplink Cells

Figure 24:
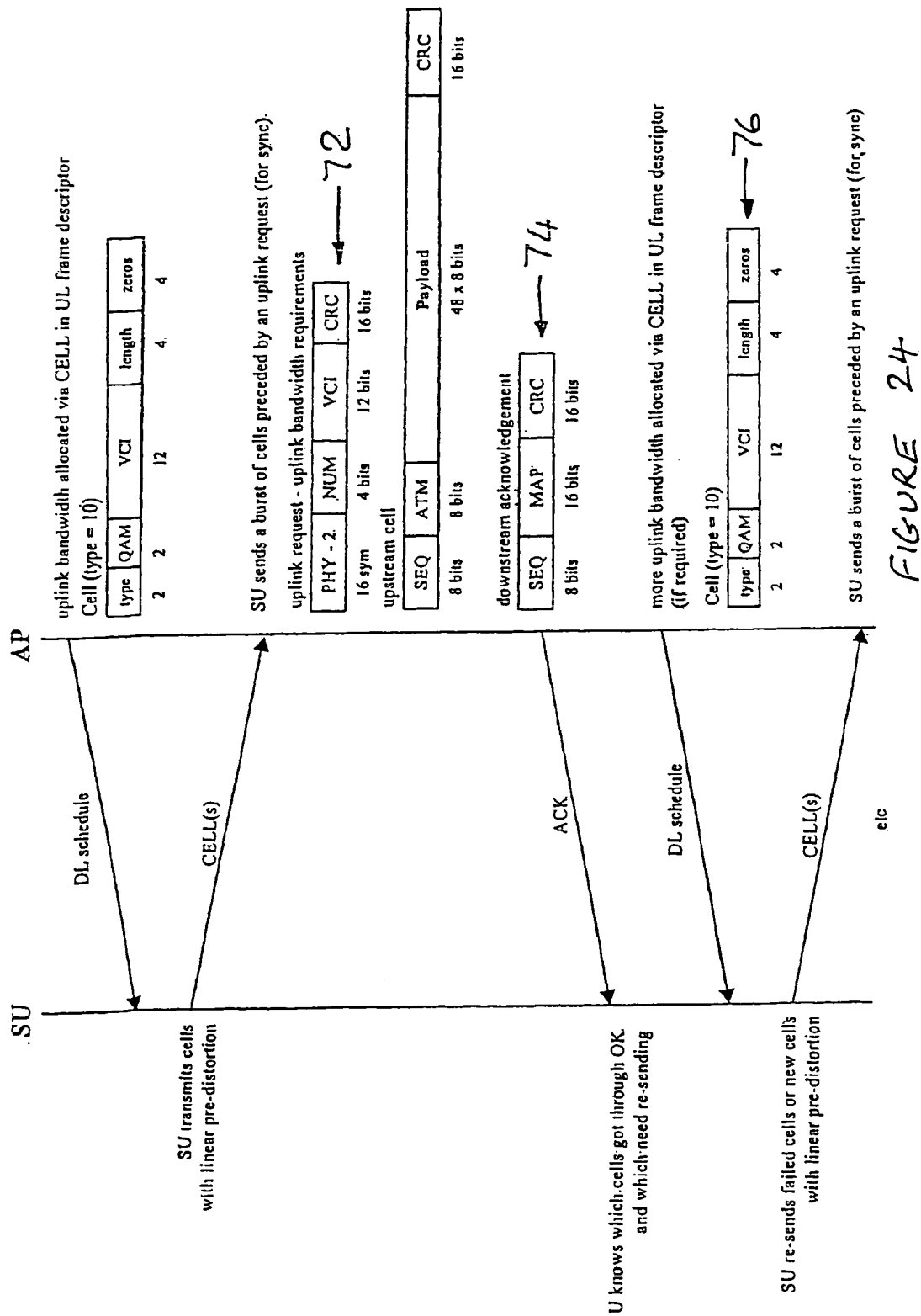
FIG. 24 illustrates the transmission and acknowledgment of cells on the uplink.

Once the AP knows of an SU's requirement for uplink access, it schedules a slot on the uplink for the SU to send the cells. FIG. 24 illustrates this procedure. The AP uses a cell descriptor field (type 10 in FIG. 12) in an uplink frame description to schedule an uplink slot for the SU to send its cells. The SU then transmits the cells with linear pre-distortion, preceded by a further uplink request 72. The uplink request is identical to the uplink request sent by the SU during contention and polling but, in this instance, is only used by the AP for synchronisation purposes.

Following receipt of the cells, the AP sends a downstream acknowledgment 74 (following a type 1 descriptor field in the downlink description 14, see FIG. 9). The downstream acknowledgment is similar to the upstream acknowledgement 56 described above but omits the initial correlation sequence, which is not required on the downlink. Thus, the downstream acknowledgment contains a sequence number SEQ, and CRC bits. If the downstream acknowledgement indicates that all cells were safely received, no further action is required. However, if the downstream acknowledgment specifies cells which were not safely received, the acknowledgement tells the SU which cells need to be re-sent. The AP then allocates further bandwidth for re-sending those cells, using a type 10 descriptor field 76 in the uplink frame descriptor. The SU then re-sends the failed cells, again with linear pre-distortion. The downstream acknowledgement procedure then repeats as required.

If the SU has requested access to send more cells than can be scheduled in a single frame, then the AP will schedule further allocations, signalled using type 10 uplink descriptor fields, as required.

Recovering from Errors in the Uplink Cell Process

Figure 25:
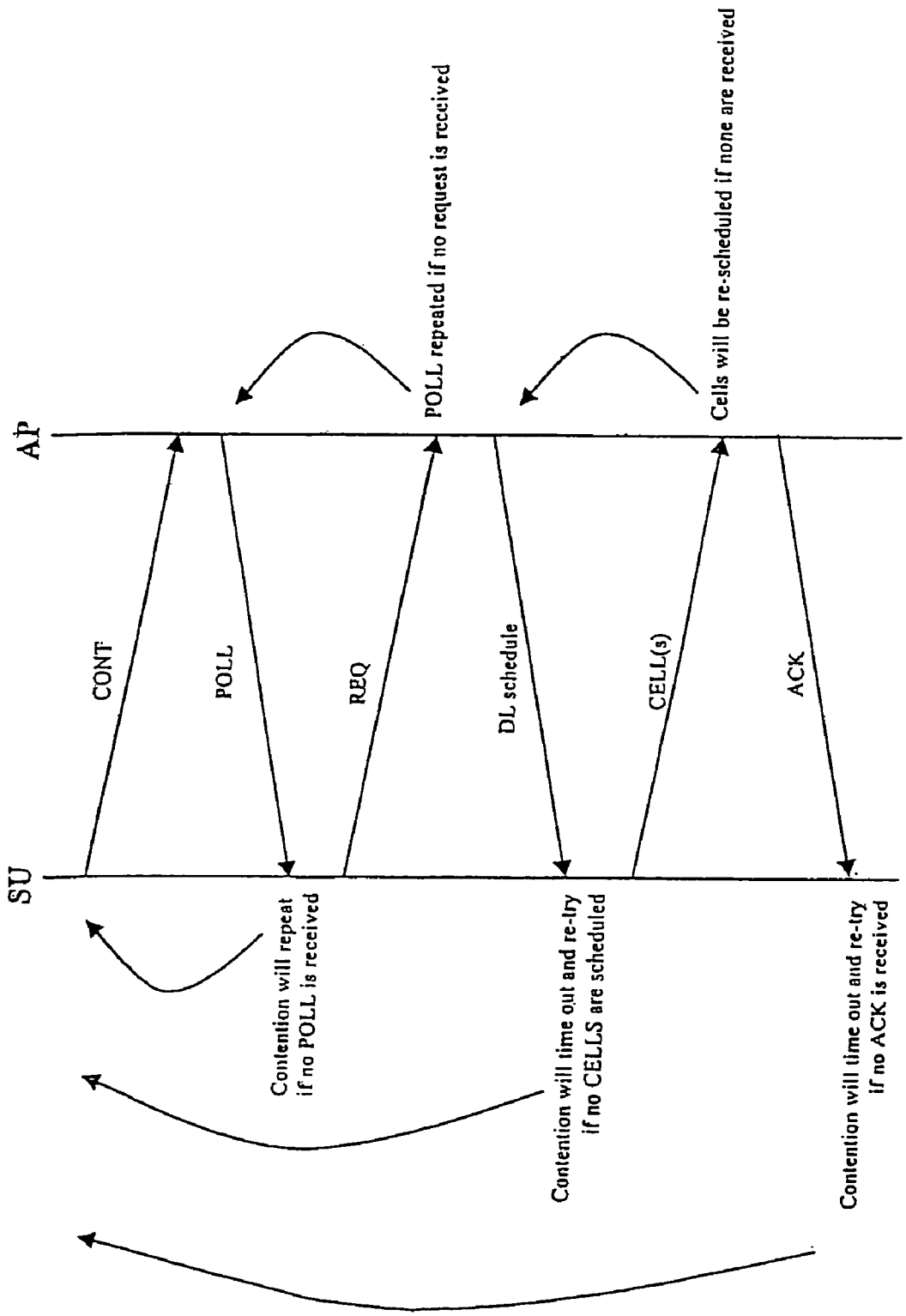
FIG. 25 illustrates the hierarchy of recovery modes in the uplink cell transmission protocol.

At each stage of the uplink access state machine, there is the possibility of a burst being lost or corrupted. The system should recover via re-scheduling if any burst fails, as illustrated in FIG. 25. This ensures robust communications even if individual transmitted bursts are lost or corrupted.

Downlink and Unlink Burst Structures

Figure 26:
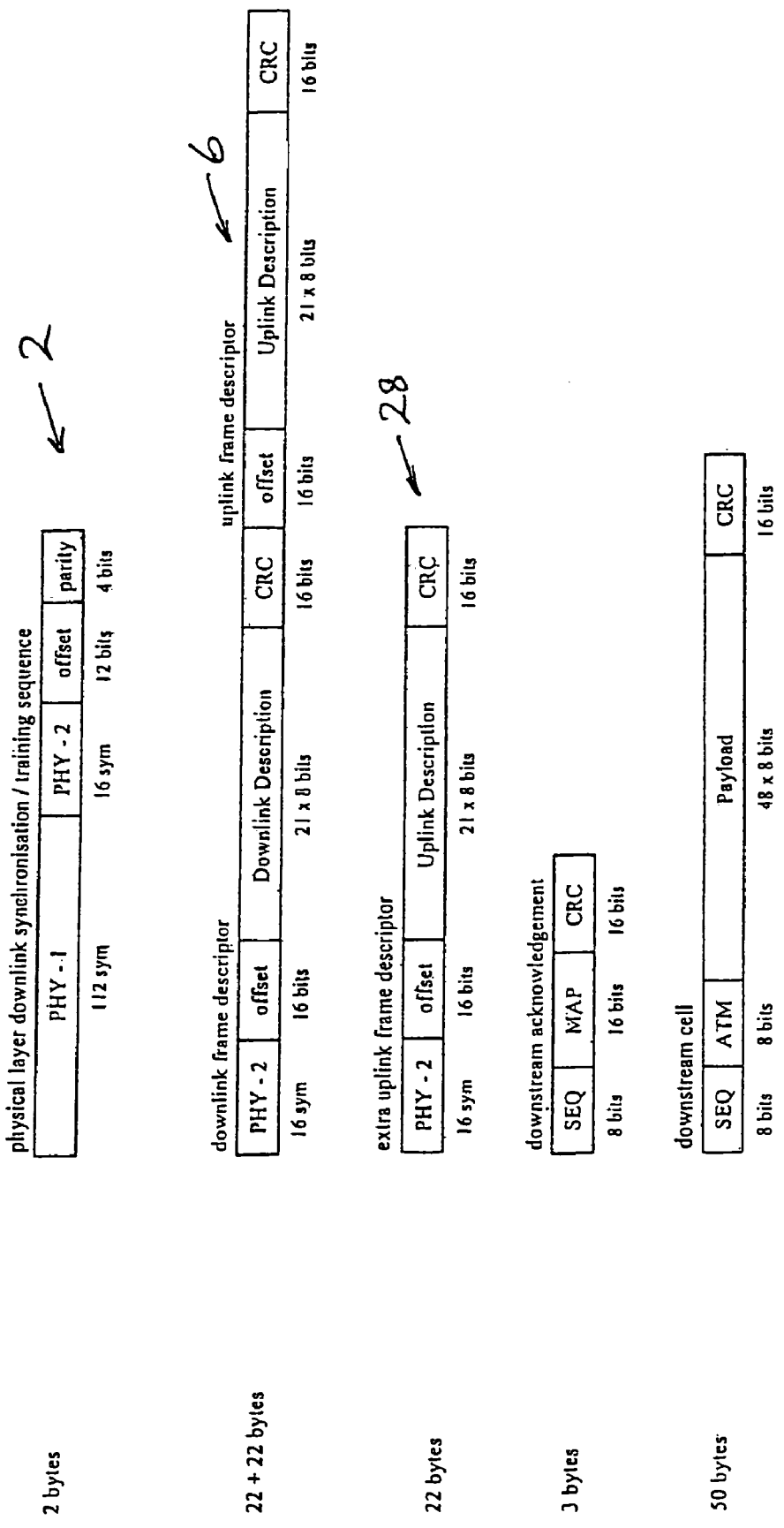
FIG. 26 illustrates the downlink burst structures used in the communications system and FIG. 27 illustrates the uplink burst structures used in the communication system.
Figure 27:
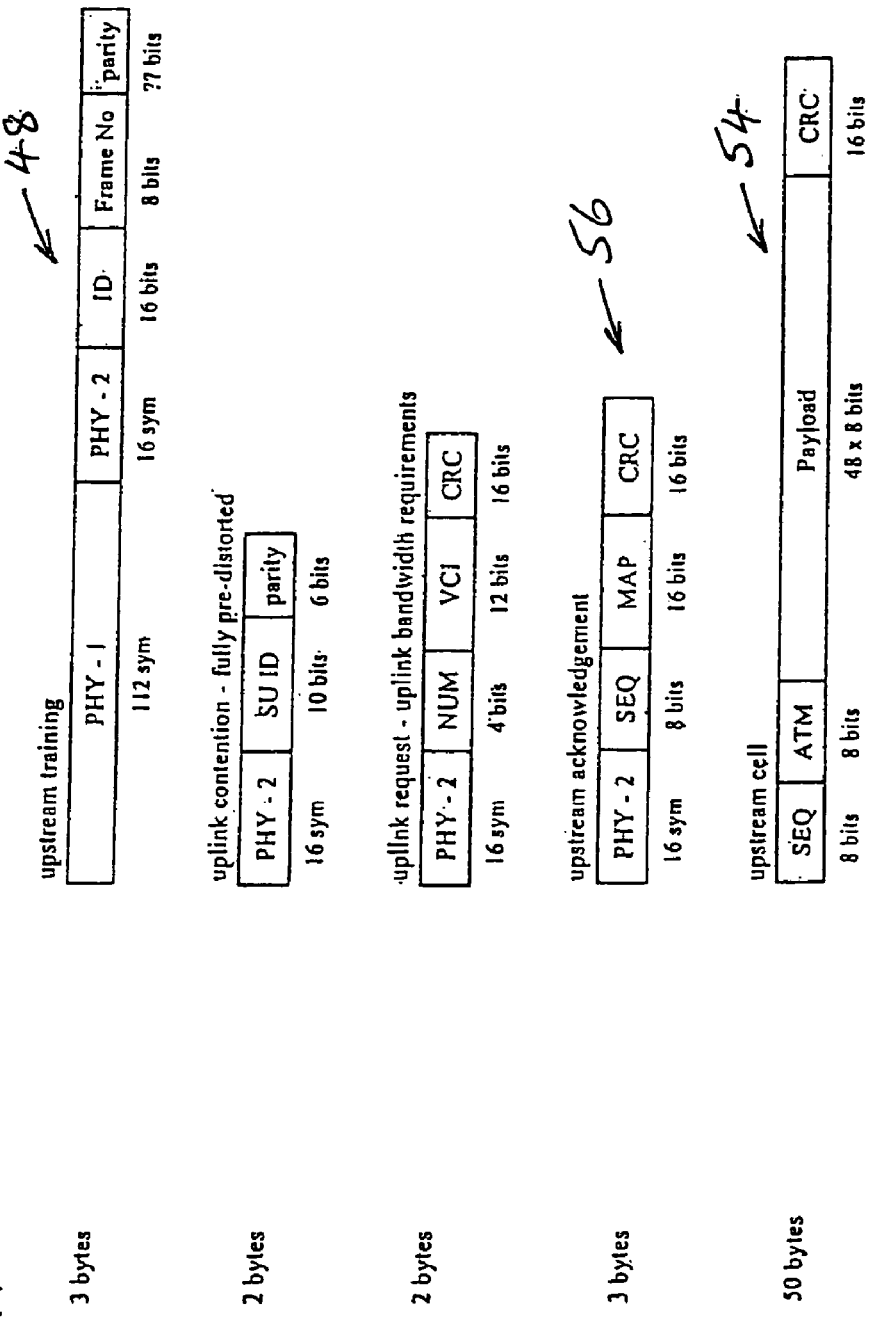

These are as described above, but are also set out for reference in FIGS. 26 and 27.

The invention claimed is:

1. A wireless communications system in which an access point (AP) transmits a downlink signal for reception by a subscriber unit (SU) and the SU transmits an uplink signal for reception by the AP, and in which the downlink signal carries synchronization bursts at predetermined times and data contained in variable length frames interleaved between the synchronization bursts, each synchronization burst comprising an offset pointer to the start of the subsequent downlink frame.

2. A communications system according to claim 1, in which each synchronization burst comprises a predetermined correlation sequence detectable by the SU in order to synchronization to the downlink signal.

3. A communications system according to claim 1, in which each downlink frame comprises a header carrying a pointer to the start of the following downlink frame.

4. A communications system according to claim 3, in which the header in each downlink frame comprises a downlink description, describing the contents of a data portion of the downlink frame.

5. A communications system according to claim 1, in which each downlink frame comprises a header carrying a pointer to the start of the following uplink frame.

6. A communications system according to claim 5, in which a downlink frame further comprises an extra pointer to the start of a second uplink frame.

7. A communications system according to claim 5, in which the header in each downlink frame comprises an uplink description, describing the contents of a data portion of the following uplink frame.

8. A communications system according to claim 1, in which the access point (AP) can schedule a wide training slot on the uplink into which the subscriber unit (SU) can transmit a training burst, the AP responding to the training burst by feeding back power control and timing information to the SU.

9. A communications system according to claim 8, in which the SU assesses the downlink channel and assumes that the uplink channel is the same as the downlink channel in order to power control and pre-distort the training burst for reception by the AP.

10. A communications system according to claim 8, in which the AP broadcasts information about the system on the downlink to allow the SU to power control and pre-distort the training burst for reception by the AP.

11. A communications system according to claim 1, in which the AP can schedule a narrow training slot on the uplink into which the SU can transmit a training burst, the AP responding to the training burst by feeding back channel information to the SU.

12. A communications system according to claim 1, in which the AP can schedule a contention slot on the uplink into which the SU can transmit a contention burst comprising its SU identifier (SUID), to which the AP responds by requesting the SU to transmit a request for an uplink bandwidth requirement.

13. A communications system according to claim 12, in which the SU pre-distorts the contention word for reception by the AP, by calculating the pre-distorted contention word off-line and storing it in memory for transmission in the contention slot.

14. A communications system according to claim 1, in which the SU pre-distorts uplink transmissions for reception by the AP.

15. A communications system according to claim 1, in which the AP transmits the downlink for reception by a plurality of SUs and the plurality of SUs can transmit uplink signals for reception by the AP.

16. A communications system according to claim 15, in which each SU fully pre-distorts uplink transmissions made in uplink slots which have not been scheduled specifically to it.

17. A communications system according to claim 16, in which the AP does not require an equalizer to decode the fully pre-distorted uplink transmissions.

18. A communications system according to claim 15, in which all SUs can decode a lowest order of modulation and one or more SUs can decode a higher order of modulation, in which each frame header is modulated in the lowest order of modulation, and in which different elements of the contents of a downlink frame are modulated using different orders of modulation, the elements being arranged in the frame in increasing order of modulation.

19. A communications system according to claim 1, in which data are carried on the downlink and the uplink in asynchronous transfer mode (ATM) cells.

20. A communications system according to claim 19, in which acknowledgements (ACKs) are sent after reception of ATM messages on the uplink or downlink, each message comprising one or more sequentially-numbered ATM cells, and each ACK following a message in which reception of one or more cells failed identifies the number of the first failed cell in the message to enable retransmission of failed cells.

21. A communications system according to claim 19, in which acknowledgements (ACKs) are sent after reception of ATM messages on the uplink or downlink, each message comprising one or more sequentially-numbered ATM cells, and each ACK following a message in which reception of one or more cells failed comprises a bit-map identifying failed cells in message to enable retransmission of failed cells.

22. An access point for a communications system as defined in claim 1.

23. A subscriber unit for a communications system as defined in claim 1.

24. A communications system in which a downlink signal carries synchronization bursts at predetermined times and data contained in variable length frames interleaved between the synchronization bursts, each synchronization burst comprising an offset pointer to the start of the subsequent downlink frame.

25. A method for wireless communication between an access point and a plurality of subscriber units, comprising the steps of:
   transmitting from the access point (AP) a downlink signal carrying synchronization bursts at predetermined times and data contained in variable length frames interleaved between the synchronization bursts, each synchronization burst comprising an offset pointer to the start of the subsequent downlink frame; and
   at each subscriber unit (SU) receiving the downlink signal and using the synchronization bursts to synchronize thereto and using at least one of the offset pointers to locate the start of the subsequent downlink frame.

26. A method according to claim 25, comprising the steps of;
   transmitting at the start of each downlink frame a header containing a pointer to the start of the next downlink frame and a downlink description describing events carried by the frame; and
   at each SU reading the header at the start of each downlink frame to decode the events in the frame, as appropriate, and to locate the start of the next downlink frame.

27. A method according to claim 25, comprising the steps of;
   transmitting from the SUs an uplink carrying data in frames, events in the uplink frames being scheduled by the AP;
   transmitting at the start of each downlink frame a header containing an uplink offset pointer and an uplink description respectively describing the offset to the start of the next uplink frame and the events carried by that frame; and
   at each SU using the offset pointer to locate the start of the next uplink frame and transmitting events in the uplink scheduled for that SU.

* * * * *

UNITED STATES PATENT AND TRADEMARK OFFICE
CERTIFICATE OF CORRECTION

PATENT NO.         : 7,529,274 B2                                    Page 1 of 1
APPLICATION NO.    : 10/483515
DATED              : May 5, 2009
INVENTOR(S)        : John David Porter It is certified that error appears in the above-identified patent and that said Letters Patent is hereby corrected as shown below:

Title Page; item (57);
In the abstract, lines 5 and 6, delete "syncronisation" and insert --synchronisation--.

Signed and Sealed this

Twenty-second Day of September, 2009

David J. Kappos
*Director of the United States Patent and Trademark Office*